United States Patent
Cho et al.

(10) Patent No.: US 10,440,556 B2
(45) Date of Patent: Oct. 8, 2019

(54) METHOD FOR UPDATING LOCATION OF TERMINAL IN WIRELESS COMMUNICATION SYSTEM AND APPARATUS FOR SUPPORTING SAME

(71) Applicant: LG ELECTRONICS INC., Seoul (KR)

(72) Inventors: Heejeong Cho, Seoul (KR); Jiwon Kang, Seoul (KR); Heejin Kim, Seoul (KR); Ilmu Byun, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/077,446

(22) PCT Filed: Feb. 10, 2017

(86) PCT No.: PCT/KR2017/001481
§ 371 (c)(1),
(2) Date: Aug. 10, 2018

(87) PCT Pub. No.: WO2017/138769
PCT Pub. Date: Aug. 17, 2017

(65) Prior Publication Data
US 2019/0053035 A1 Feb. 14, 2019

Related U.S. Application Data

(60) Provisional application No. 62/353,035, filed on Jun. 22, 2016, provisional application No. 62/351,278, (Continued)

(51) Int. Cl.
*H04W 8/08* (2009.01)
*H04W 8/04* (2009.01)
(Continued)

(52) U.S. Cl.
CPC ........... *H04W 8/08* (2013.01); *H04L 61/2503* (2013.01); *H04W 8/04* (2013.01); *H04W 8/26* (2013.01);
(Continued)

(58) Field of Classification Search
CPC ....... H04W 8/08; H04W 76/14; H04W 76/11; H04W 8/04; H04W 8/26; H04W 88/04; H04W 88/16; H04L 61/2503
See application file for complete search history.

(56) References Cited

U.S. PATENT DOCUMENTS 9,692,567 B1 * 6/2017 Vaidya ................. H04L 5/0037
9,913,242 B1 * 3/2018 Saleh .................. H04W 64/003
(Continued)

FOREIGN PATENT DOCUMENTS

| KR | 20130007198 | 1/2013 |
|---|---|---|
| WO | 2015031171 | 3/2015 |

OTHER PUBLICATIONS

PCT International Application No. PCT/KR2017/001481, International Search Report dated Jun. 20, 2017, 12 pages.

*Primary Examiner* — Ernest G Tacsik
(74) *Attorney, Agent, or Firm* — Lee, Hong, Degerman, Kang & Waimey

(57) ABSTRACT

The present invention relates to a method and an apparatus for performing, by a first mobility management entity (MME), a change of an MME in a wireless communication system. The present invention may provide a method and an apparatus which receive a tracking area update (TAU) request message including MME information related to a second MME to be changed, from a terminal through a base station; transmits, to the second MME, a context request message requesting context information of the terminal; receives, from the second MME, a context response message including the context information; and transmits, to at least (Continued)

one MME, a message informing that an MME managing mobility of the terminal has changed from the second MME to the first MME.

11 Claims, 17 Drawing Sheets

Related U.S. Application Data filed on Jun. 16, 2016, provisional application No. 62/305,541, filed on Mar. 9, 2016, provisional application No. 62/293,774, filed on Feb. 11, 2016.

(51) Int. Cl.
    *H04W 8/26*     (2009.01)
    *H04W 76/14*     (2018.01)
    *H04W 76/11*     (2018.01)
    *H04L 29/12*     (2006.01)
    *H04W 88/04*     (2009.01)
    *H04W 88/16*     (2009.01)

(52) U.S. Cl.
    CPC ............ *H04W 76/11* (2018.02); *H04W 76/14* (2018.02); *H04W 88/04* (2013.01); *H04W 88/16* (2013.01); *H04L 61/103* (2013.01); *H04L 61/2007* (2013.01); *H04L 61/6022* (2013.01)

(56) References Cited

U.S. PATENT DOCUMENTS

| | | | | |
|---|---|---|---|---|
| 2007/0293249 | A1* | 12/2007 | Wang | H04L 12/189 455/466 |
| 2010/0056175 | A1* | 3/2010 | Bachmann | H04W 8/08 455/456.1 |
| 2011/0116449 | A1 | 5/2011 | Hu et al. | |
| 2012/0063430 | A1* | 3/2012 | Suh | H04W 8/26 370/338 |
| 2012/0196599 | A1* | 8/2012 | Cho | H04W 8/04 455/435.1 |
| 2013/0121282 | A1* | 5/2013 | Liu | H04W 28/08 370/329 |
| 2013/0155948 | A1* | 6/2013 | Pinheiro | H04W 4/70 370/328 |
| 2014/0115187 | A1 | 4/2014 | Li et al. | |
| 2015/0223284 | A1 | 8/2015 | Jain et al. | |
| 2016/0095036 | A1* | 3/2016 | Stojanovski | H04W 4/08 370/331 |
| 2017/0006503 | A1* | 1/2017 | Panaitopol | H04W 88/04 |
| 2017/0150467 | A1* | 5/2017 | Tamura | H04W 48/00 |
| 2017/0201937 | A1* | 7/2017 | Zhang | H04W 8/20 |
| 2017/0238223 | A1* | 8/2017 | Zhou | H04W 36/00 370/328 |

\* cited by examiner

[FIG. 1]
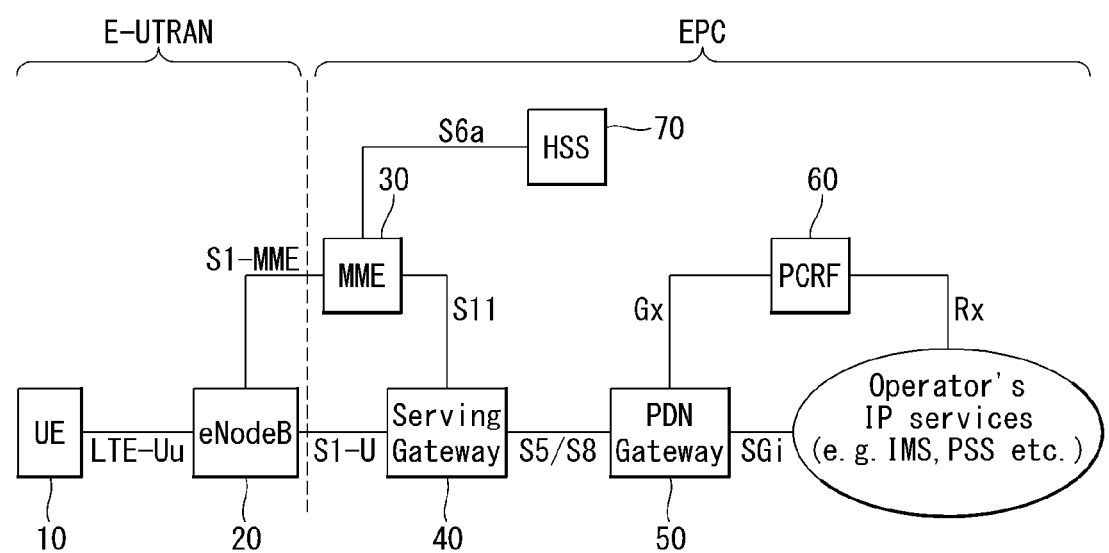

[FIG. 2]
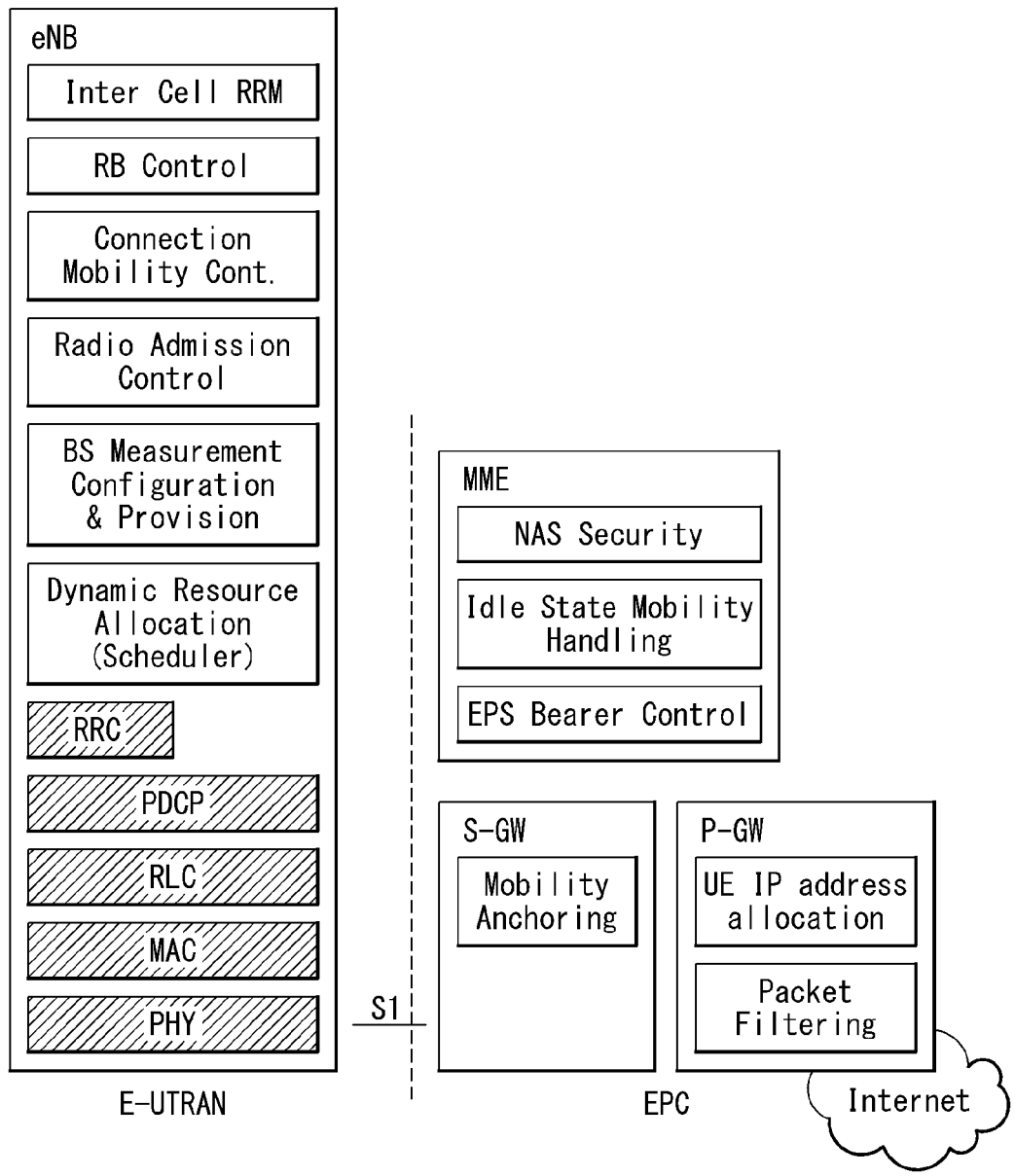

【FIG. 3】
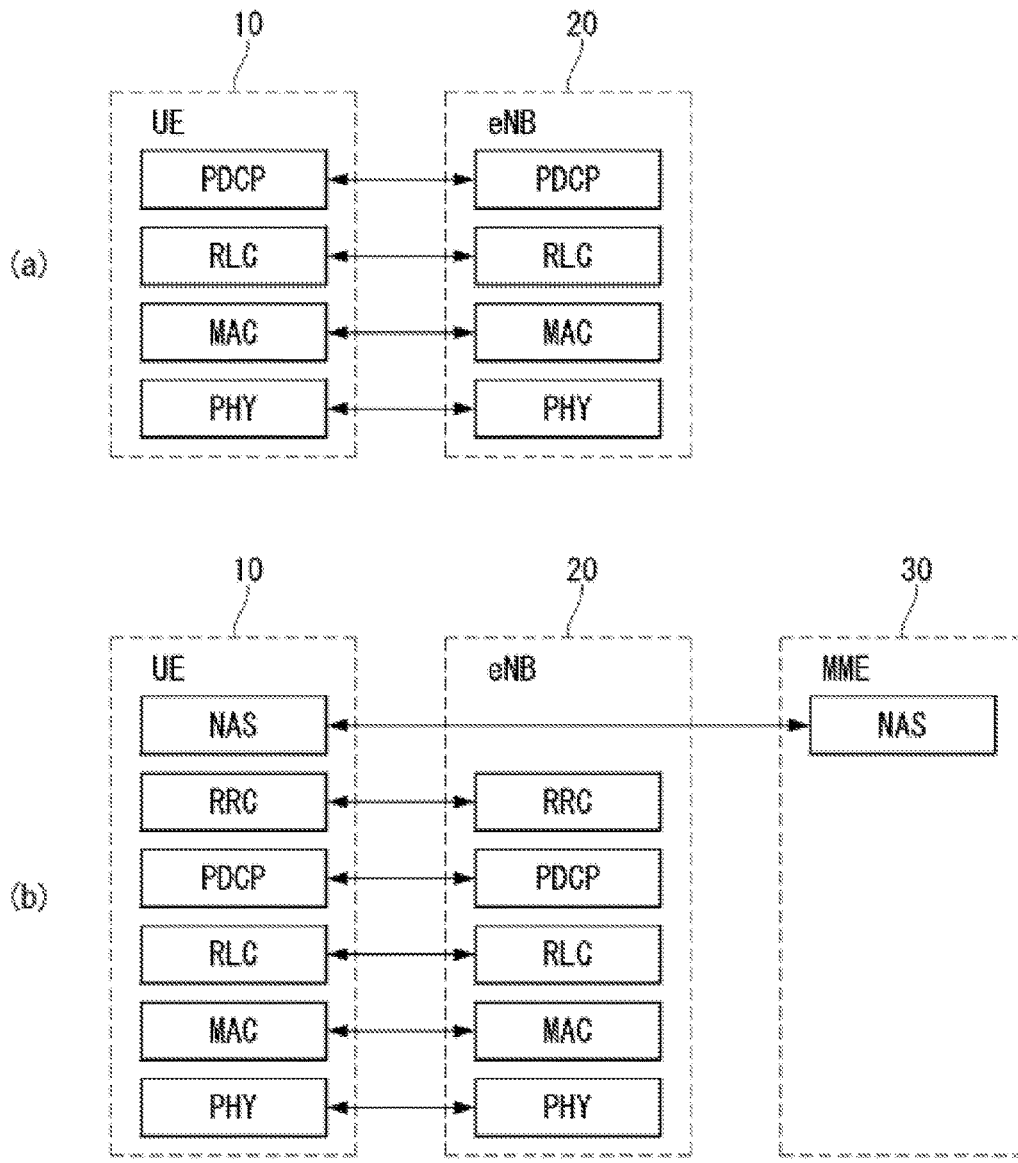
(-Prior Art-)

【FIG. 4】
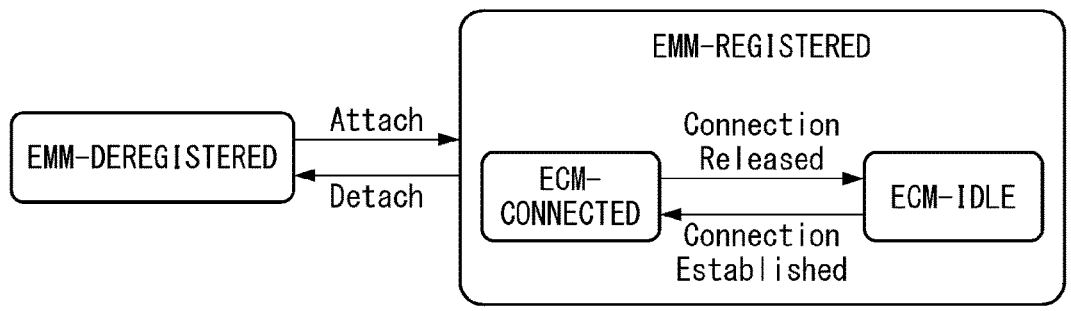
【FIG. 5】
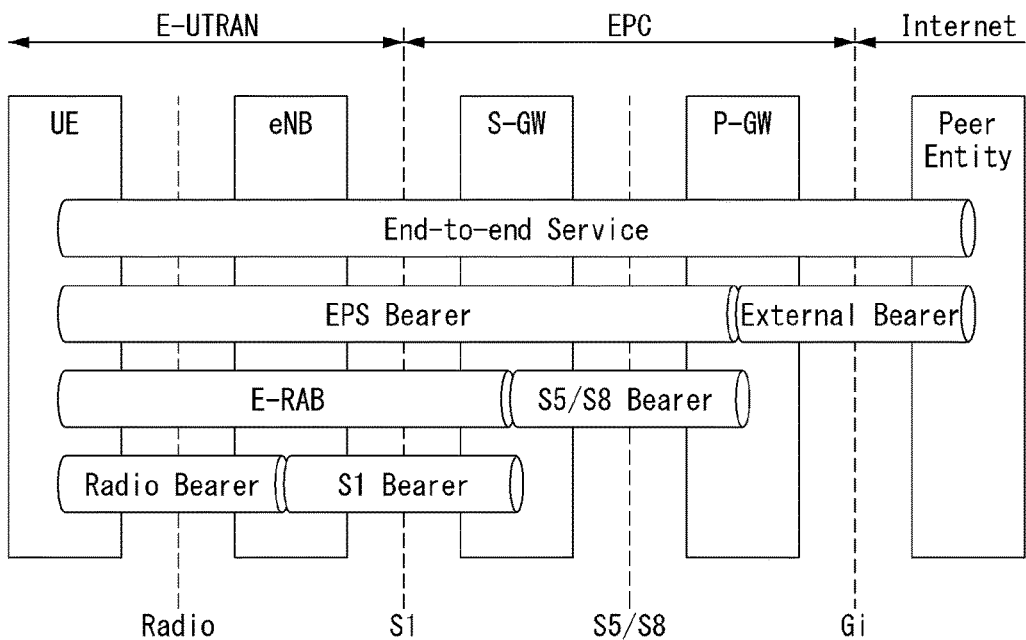

[FIG. 6]
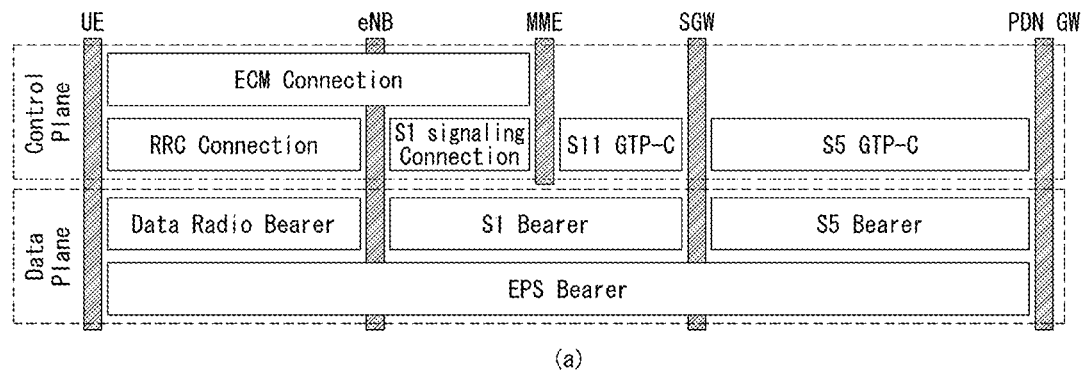
(a)
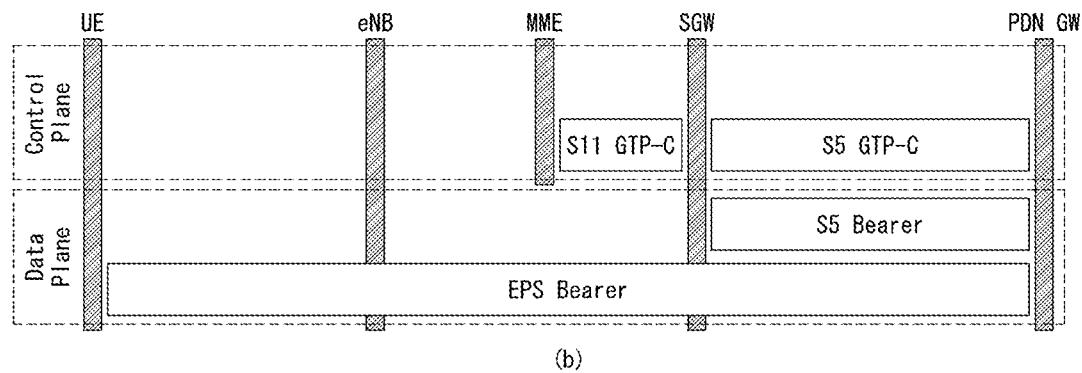
(b)

[FIG. 7]
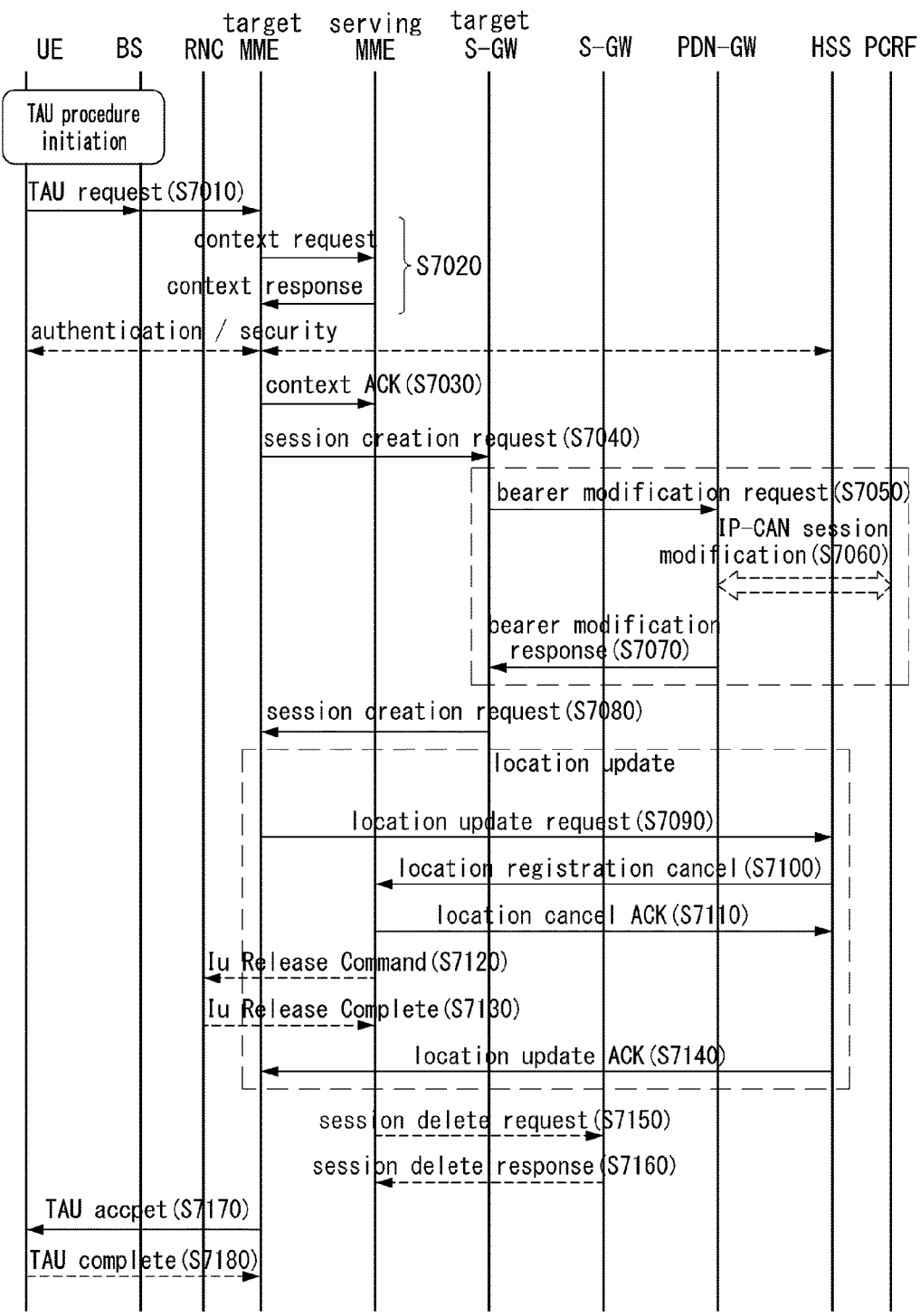

【FIG. 8】
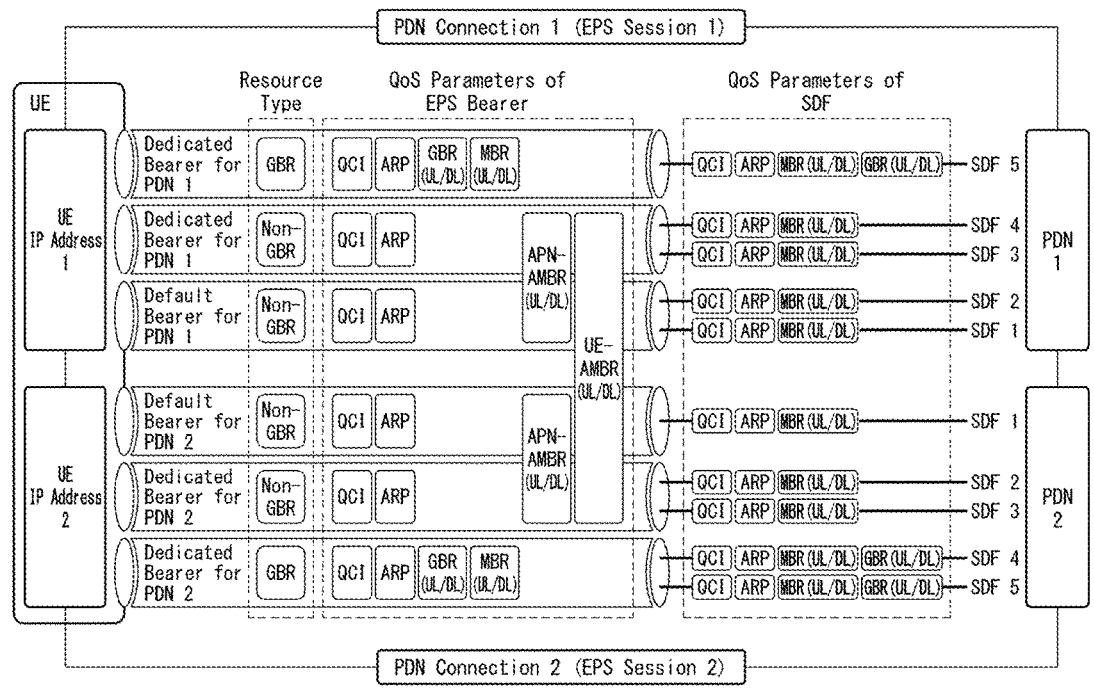

[FIG. 9]
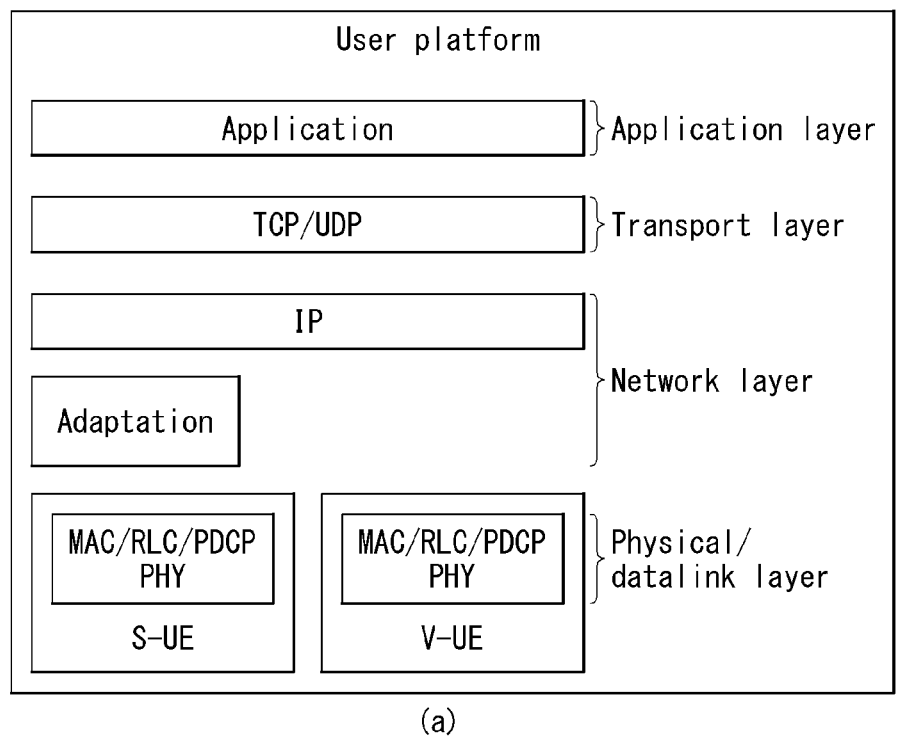
(a)
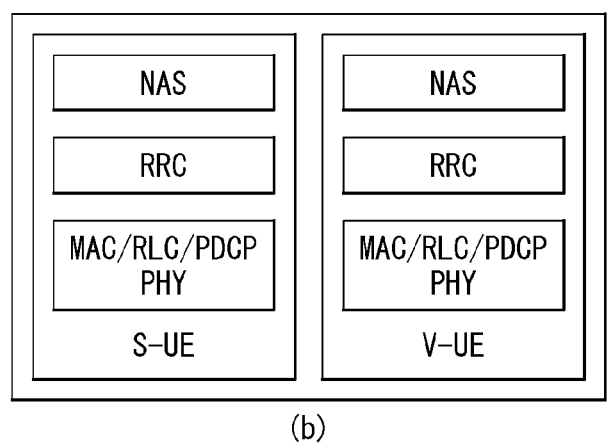
(b)

[FIG. 10]
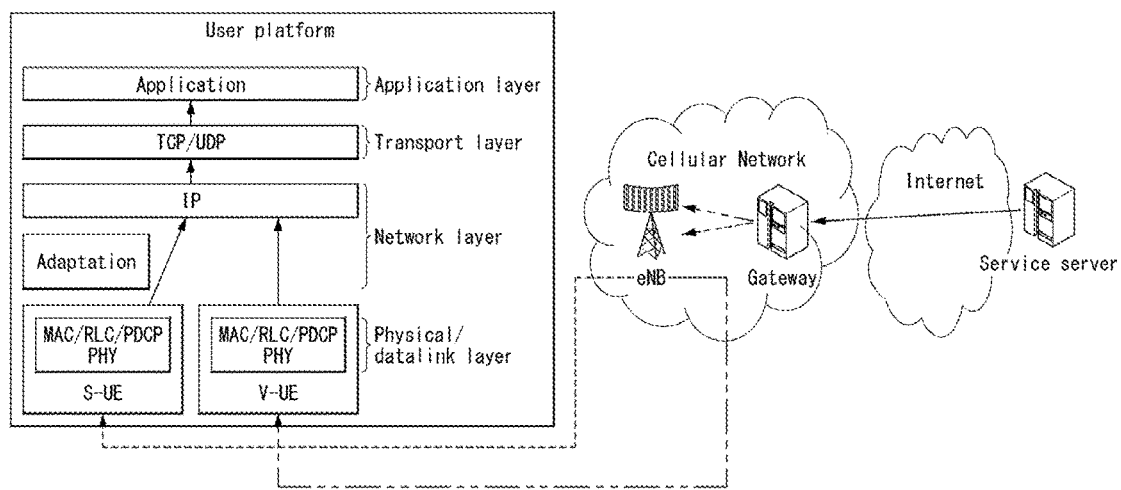

[FIG. 11]
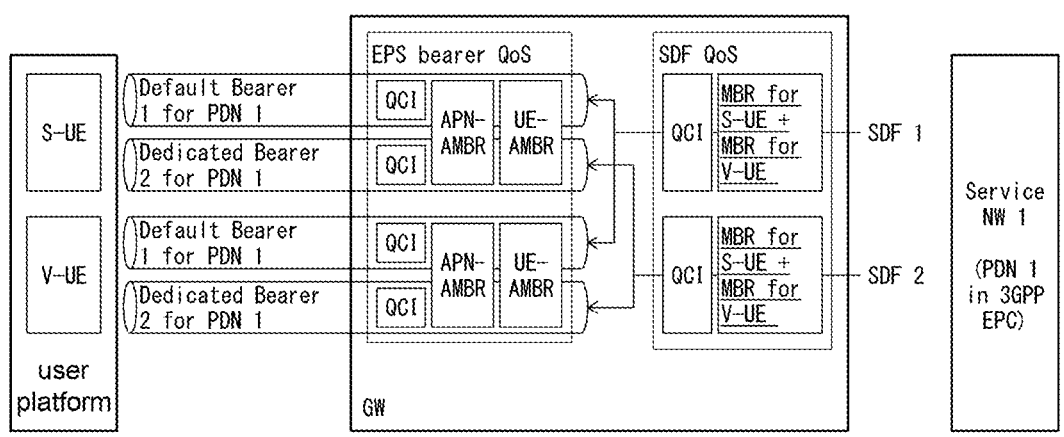

【FIG. 12】
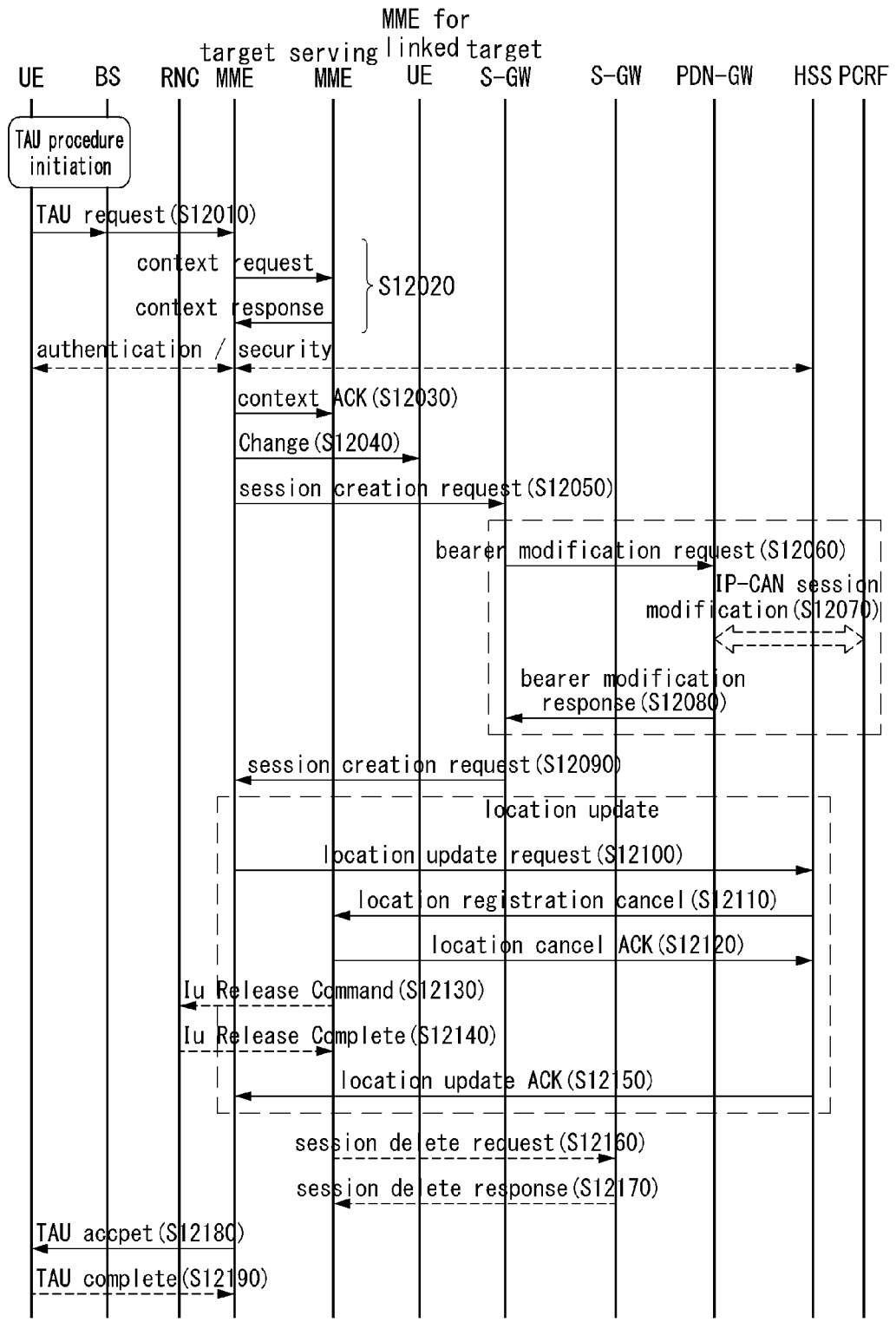

[FIG. 13]
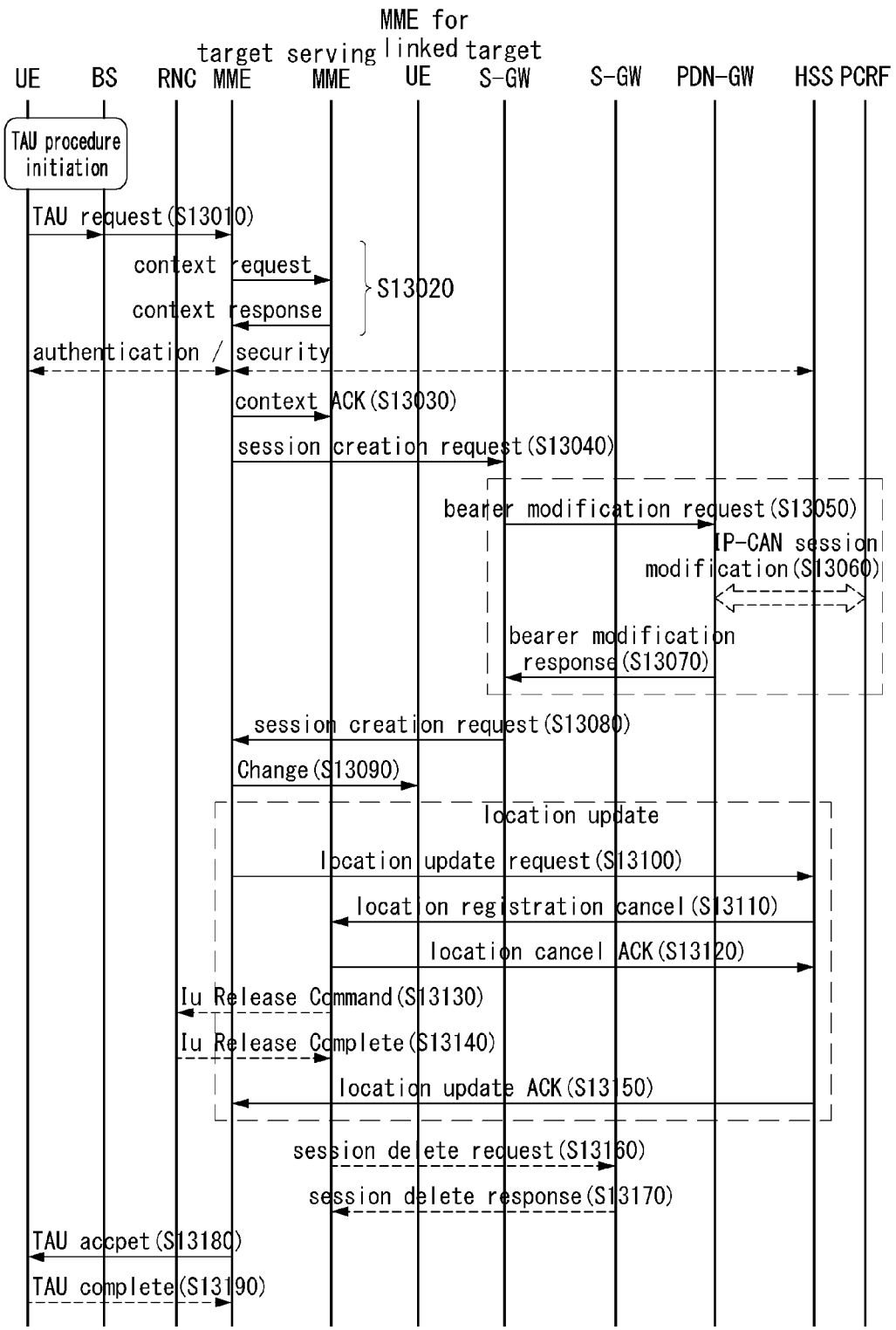

[FIG. 14]
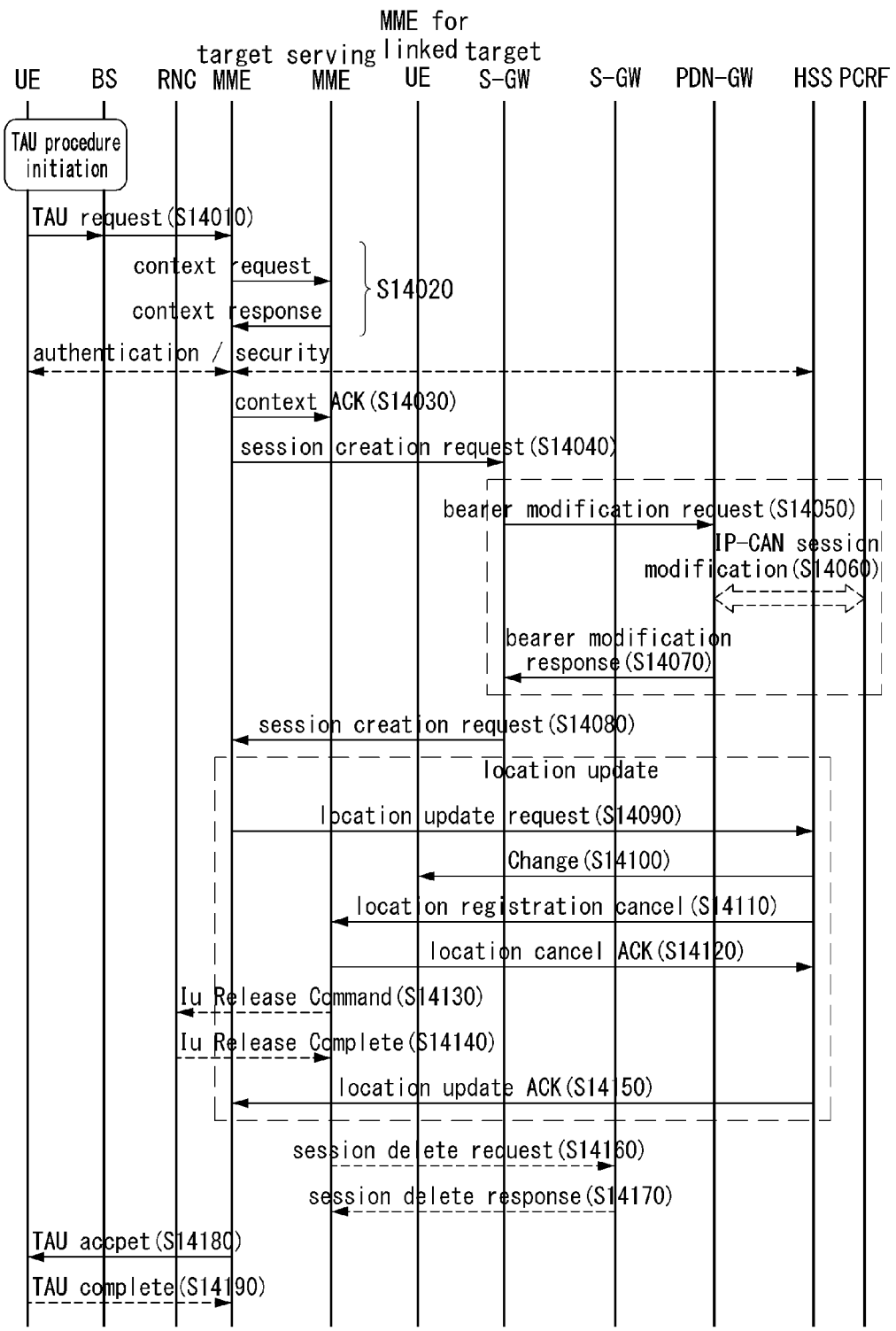

[FIG. 15]
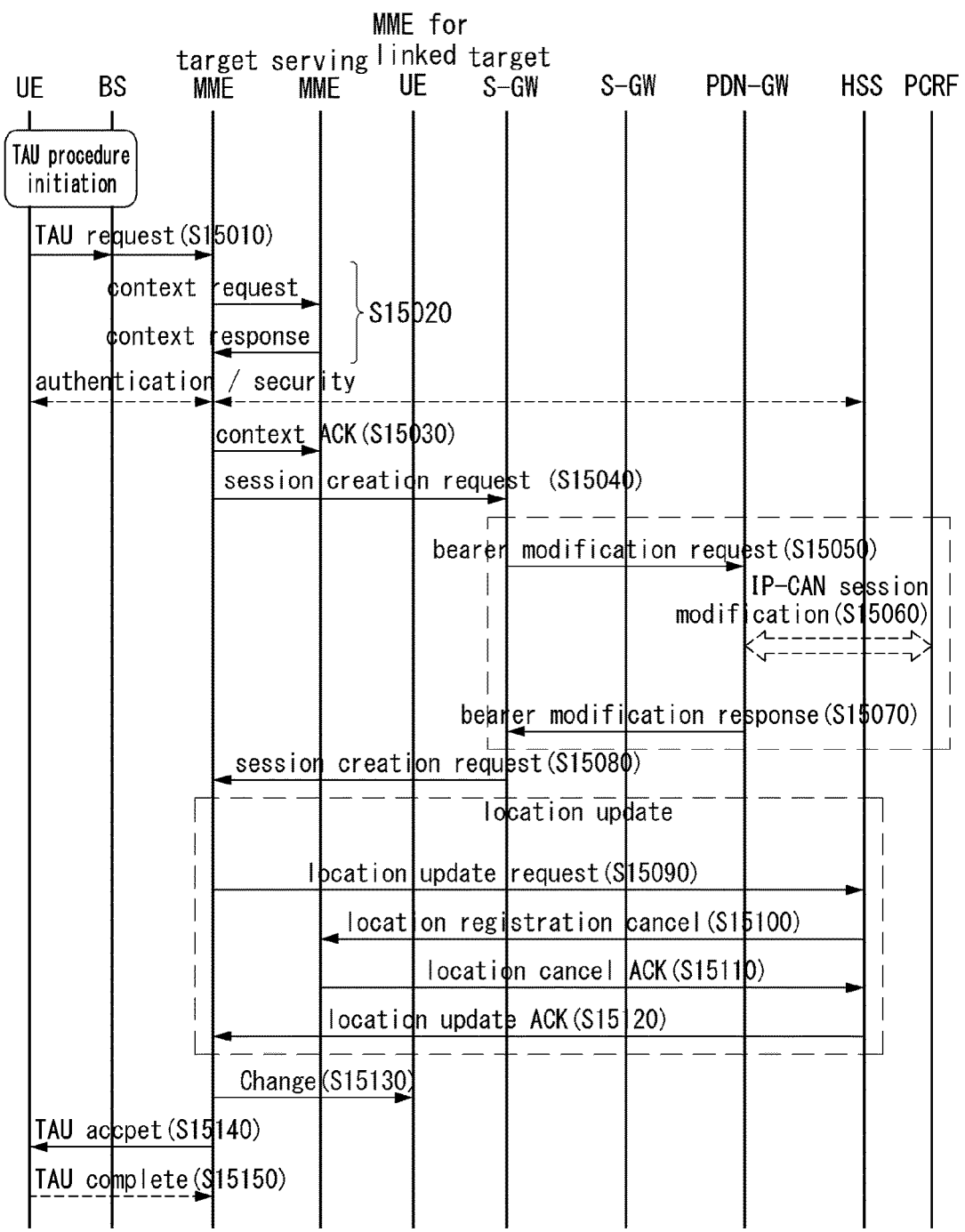

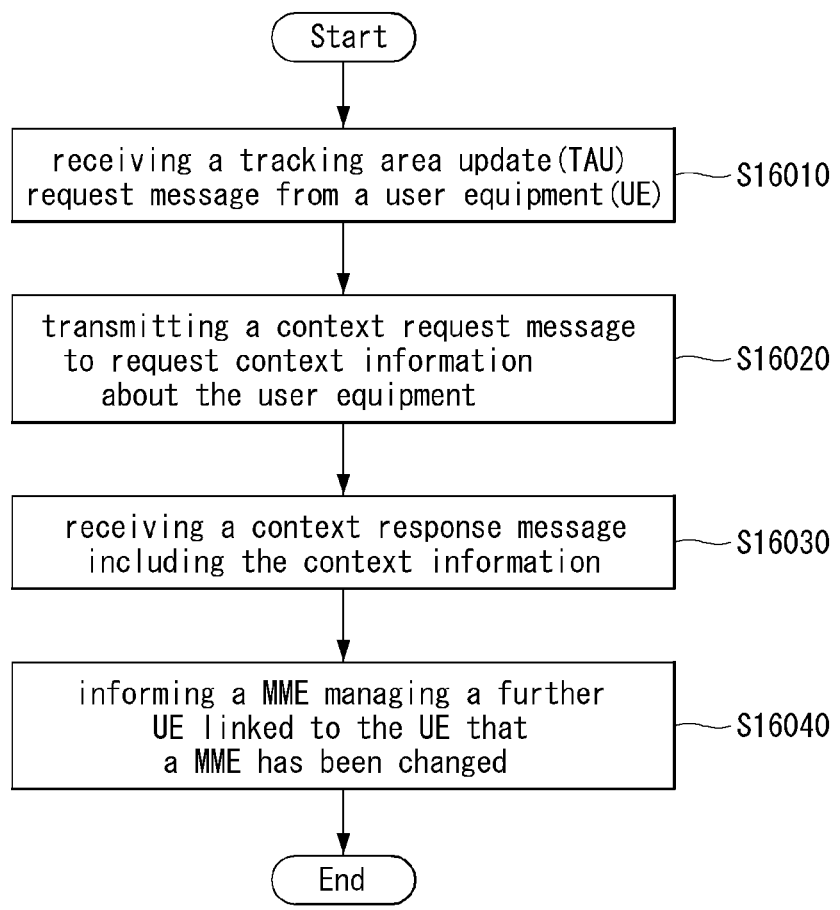
[FIG. 16]

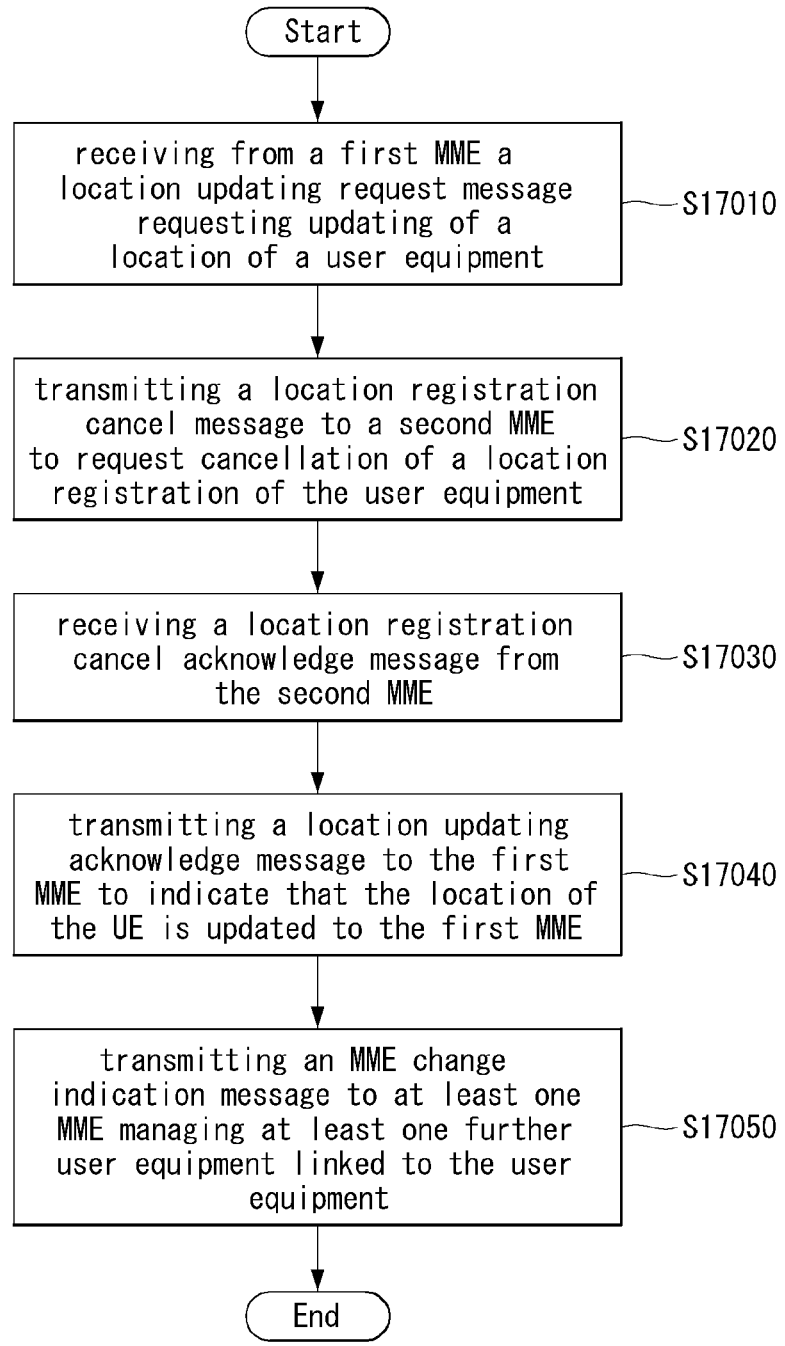

[FIG. 18]
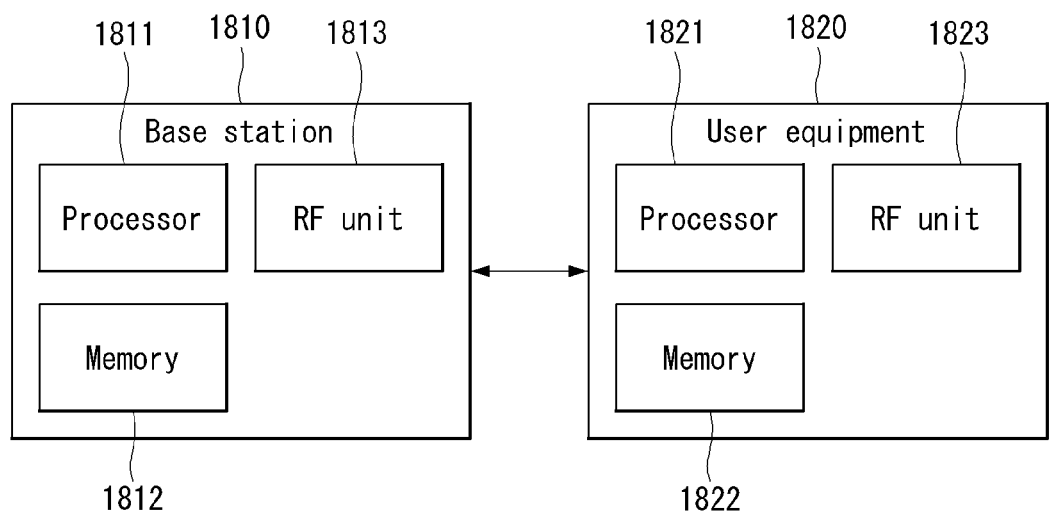

METHOD FOR UPDATING LOCATION OF TERMINAL IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2017/001481, filed on Feb. 10, 2017, which claims the benefit of U.S. Provisional Application Nos. 62/293,774, filed on Feb. 11, 2016, 62/305,541, filed on Mar. 9, 2016, 62/351,278, filed on Jun. 16, 2016, and 62/353,035, filed on Jun. 22, 2016, the contents of which are all hereby incorporated by reference herein in their entirety.

TECHNICAL FIELD

The present invention relates to updating of a location of a user equipment in a wireless communication system. More specifically, the present invention relates to a method and device for recognizing a changed MME when an MME that manages a user equipment is changed according to an updated location of the user equipment.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

One object of the present invention is to provide a method and device for recognizing a changed MME when an MME that manages a user equipment is changed according to an updated location of the user equipment.

A further object of the present invention is to provide a method and a device for allowing information on a changed MME according to an updated location of a user equipment to be recognized by a MME for managing a user equipment linked to the user equipment.

Further, a still further object of the present invention is to provide a method and a device for transmitting, when a MME is changed according to an updated location of a user equipment, information on the changed MME and information on a user equipment managed by the changed MME to an MME for managing an user equipment linked to the user equipment.

The technical problems to be solved by the present invention are not limited to the above-mentioned technical problems. Other technical problems which are not mentioned may be clearly understood from the following descriptions to those skilled in the art to which the present invention belongs.

Technical Solution

According to the present invention, a method and a device for updating a location of a user equipment are provided to solve the above-mentioned problems In a first aspect of the present invention, there is provided a method for performing a mobility management entity (MME) change by a first mobility management entity (MME) in a wireless communication system, the method comprising: receiving a tracking area update (TAU) request message from a user equipment (UE) via a base station, wherein the TAU request message includes MME information about a second MME to be changed; transmitting a context request message to the second MME to request context information of the user equipment; receiving a context response message including the context information from the second MME, wherein the context information includes user equipment information related to one or more user equipments linked to the user equipments, and MME information related to at least one MME managing the one or more user equipments; and transmitting a message to the at least one MME to inform that a MME managing a mobility of the user equipment (UE) has been changed from the second MME to the first MME.

In one embodiment of the first aspect, the one or more user equipments linked to the user equipment are assigned same Internet protocol (IP) address as the user equipment.

In one embodiment of the first aspect, the method further comprises: transmitting to a gateway a session creation request message requesting creation of a session; and receiving a session creation response message in response to the session creation request message, wherein the message is transmitted after the session creation response message has been received.

In one embodiment of the first aspect, the method further comprises: transmitting to a gateway a session change request message requesting a change of a session; and receiving a session change response message in response to the session change request message, wherein the message is transmitted after the session change response message has been received.

In one embodiment of the first aspect, the method further comprises: transmitting to a home subscriber sever (HSS) a location updating request message requesting updating of a location of the user equipment; and in response to the location updating request message, receiving a location updating acknowledge message from the HHS, wherein the message is transmitted after the location updating acknowledge message has been received.

In one embodiment of the first aspect, the user equipment information includes identification information to identify the one or more user equipments, wherein the MME information includes identification information to identify the at least one MME managing a mobility of the one or more user equipment.

In one embodiment of the first aspect, the context information further includes a gateway identifier assigned to the user equipment, and a session identifier indicating a session established between the user equipment and the gateway.

In a second aspect of the present invention, there is provided a method for performing, by a home subscriber sever (HSS), a tracking area update (TAU) procedure with a mobility management entity (MME) change in a wireless communication system, the method comprising: receiving from a first MME a location updating request message requesting updating of a location of a user equipment; transmitting a location registration cancel message to a second MME to request cancellation of a location registration of the user equipment; receiving a location registration cancel acknowledge message from the second MME in response to the location registration cancel message; transmitting a location updating acknowledge message to the first MME in response to the location updating message; and transmitting a message to at least one MME managing a mobility of one or more user equipments linked to the user equipment in order to inform that a MME for the user equipment has been changed from the second MME to the first MME, wherein the HSS stores context information about each of the user equipment and the one or more user equipments.

In one embodiment of the second aspect, the one or more user equipments linked to the user equipment are assigned same Internet protocol (IP) address as the user equipment.

In one embodiment of the first aspect, the context information includes at least one of: a first user equipment identifier for identifying each of the user equipment and the one or more user equipments; a second user equipment identifier for identifying an user equipment linked to each of the user equipment and the one or more user equipments; and of a gateway identifier for identifying an allocated gateway; or a session identifier for identifying a session established between the gateway and the user equipment and the one or more user equipment.

In a third aspect of the present invention, there is provided a first mobility management entity (MME) for performing a MME change in a wireless communication system, the first MME comprising: a communication unit configured to transmit and receive a radio signal with an external; and a processor functionally coupled to the communication unit, wherein the processor is configured for: receiving a tracking area update (TAU) request message from a user equipment (UE) via a base station, wherein the TAU request message includes MME information about a second MME to be changed; transmitting a context request message to the second MME to request context information of the user equipment; receiving a context response message including the context information from the second MME, wherein the context information includes user equipment information related to one or more user equipments linked to the user equipments, and MME information about at least one MME managing the one or more user equipments; and transmitting a message to the at least one MME to inform that a MME managing a mobility of the user equipment (UE) has been changed from the second MME to the first MME.

Advantageous Effects

The present invention has an effect that when a MME managing a user equipment is changed in accordance with an updated location of the user equipment, MMEs for managing the user equipment linked to the user equipment recognize the changed MME.

Further, the present invention has an effect that when a MME managing an user equipment is changed according to an updated location of the user equipment, the changed MME transmit information about the user equipment and the changed MME to MMEs for managing the user equipment linked with the user equipment, thereby enabling the MMEs to recognize the changed MME.

Further, the present invention has an effect that when a MME managing a user equipment is changed according to an updated location of the user equipment, a HSS sends information about the changed MME and information about the user equipment to the MMEs managing the user equipment linked with the user equipment, thereby enabling the MMEs to recognize the changed MME.

The effects obtainable herein are not limited to the effects mentioned above, and other effects not mentioned may be clearly understood by those skilled in the art to which the present invention belongs from the following descriptions.

DESCRIPTION OF DRAWINGS

FIG. 1 shows one example of Evolved Packet System (EPS) related to a LTE system to which the present invention may be applied.

FIG. 2 is a block diagram of functional splitting between E-UTRAN and EPC to which the present invention may be applied.

FIG. 3 is a block diagram of one example of a radio protocol architecture to which technical features of the invention may be applied.

FIG. 4 illustrates EMM and ECM states in a wireless communication system to which the present invention may be applied.

FIG. 5 illustrates a bearer structure in a wireless communication system to which the present invention may be applied.

FIG. 6 illustrates a transmission path of a control plane and user plane in an EMM registered state in a wireless communication system to which the present invention may be applied.

FIG. 7 is a flow chart showing one example of Tacking Area Update Procedure (TAU) in a wireless communication system to which the present invention may be applied.

FIG. 8 shows one example of parameter configuration for QoS (Quality of Service) management.

FIG. 9 is a block diagram of one example of a radio protocol architecture of a user platform to which the present invention may be applied.

FIG. 10 shows one example of a data transmission/reception method between a user platform and a base station to which the present invention may be applied.

FIG. 11 shows one example of parameter configuration for Quality of Service (QoS) management to which the present invention may be applied.

FIG. 12 is a flow chart showing one example of a method for transmitting information about a changed MME to which the present invention may be applied.

FIG. 13 is a flow chart showing another example of a method for transmitting information about a changed MME to which the present invention may be applied.

FIG. 14 is a flow-chart showing still another example of a method for transmitting information about a changed MME to which the present invention may be applied.

FIG. 15 is a flow chart showing still another example of a method for transmitting information about a changed MME to which the present invention may be applied.

FIG. 16 is a flow-chart showing one example of a method for transmitting, by a changed MME, information about the changed MME to which the present invention may be applied.

FIG. 17 is a flow-chart showing one example of a method by which a HSS transmits information about a changed MME to which the present invention may be applied.

FIG. 18 shows one example of an internal block diagram of a wireless device to which the present invention may be applied.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the present disclosure, a base station has a meaning of a user equipment node of a network, which directly communicates with a user equipment. In some cases, a specific operation described as being performed by the base station may also be performed by an upper node of the base station. Namely, it is apparent that, in a network including a plurality of network nodes including a base station, various operations performed for communication with a user equipment may be performed by the base station, or network nodes other than the base station. The term 'base station (BS)' may be replaced by the term 'fixed station', 'Node B', 'evolved-NodeB (eNB)', 'base transceiver system (BTS)', 'access point (AP)', and the like. The term 'user equipment" may be fixed or mobile, and may be replaced with the term 'user equipment (UE)', 'mobile station (MS)', 'user user equipment (UT)', 'mobile subscriber station (MSS)', 'subscriber station (SS)', 'advanced mobile station (AMS)', 'wireless user equipment (WT)', 'machine-type communication (MTC) device', 'machine-to-machine (M2M) device', 'device-to-device (D2D) device', and the like.

Hereinafter, the downlink (DL) means communication from a base station to a user equipment, and the uplink (UL) means communication from a user equipment to a base station. In the downlink, a transmitter may be part of a base station, and a receiver may be part of a user equipment.

In the uplink, a transmitter may be part of a user equipment, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by at least one standard document which is described in IEEE 802, 3GPP and 3GPP2, which are wireless access systems. That is, among the embodiments of the present invention, steps or parts that are not described for disclosing the technical concept of the present invention apparently may be supported by the documents. In addition, all terms disclosed in this document may be described by the standard document.

For clear description, the present invention is described mainly for 3GPP LTE/LTE-A, but the technical features of the present invention are not limited thereto, but may also be applied to 5G system.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located.

APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway.

Service Data Flow (SDF): IP flow of a user traffic or combination of a plurality of IP flows which is classified according to a service type.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

TIN: Temporary Identity used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, UE identity known to an MME FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE) 10 and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station 20, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM backoff timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

FIG. 2 illustrates a functional split of an E-UTRAN and an EPC to which the present invention can be applied.

Referring to FIG. 2, a deviate crease line block indicates radio protocol layer, and an empty block indicates the functional entity of a control plane.

A base station performs the following function. (1) radio resource management (RRM) functions, such as radio bearer control, radio admission control, connection mobility control, and dynamic resource allocation to a user equipment, (2) Internet protocol (IP) header compression and the encryption of a user data stream, (3) the routing of user plane data toward an S-GW, (4) the scheduling and transmission of a paging message, (5) the scheduling and transmission of broadcast information, and (6) measurement for mobility and scheduling and a measurement report configuration.

The MME performs the following functions. (1) the distribution of a paging message to base stations, (2) security control, (3) idle state mobility control, (4) SAE bearer control, and (5) the ciphering and integrity protection of non-access stratum (NAS) signaling.

The S-GW performs the following functions. (1) the termination of a user plane packet for paging and (2) user plane switching for the support of user equipment mobility.

FIG. 3 is a block diagram showing an example of radio protocol architecture to which the technical characteristics of the present invention may be applied.

FIG. 3(a) shows an example of radio protocol architecture for a user plane, and FIG. 3(b) is a block diagram showing an example of radio protocol architecture for a control plane.

The user plane is a protocol stack for user data transmission, and the control plane is a protocol stack for control signal transmission.

Referring to FIGS. 3(a) and 3(b), a physical (PHY) layer provides information transfer service to a higher layer using a physical channel. The physical layer is connected to a medium access control (MAC) layer, that is, a higher layer, through a transport channel. Data is moved between the MAC layer and the physical layer through the transport channel. The transport channel is classified depending on how data is transmitted through a radio interface according to which characteristics.

Data is moved through a physical channel between different physical layers, that is, the physical layers of a transmitter and a receiver. The physical channel may be modulated according to an orthogonal frequency division multiplexing (OFDM) scheme, and uses time and a frequency as radio resources.

The function of the MAC layer includes mapping between a logical channel and a transport channel and multiplexing/demultiplexing (the meaning of "/" includes both the concepts of "or" and "and") to a transport block provided to a physical channel on the transport channel of an MAC service data unit (SDU) that belongs to a logical channel. The MAC layer provides service to a radio link control (RLC) layer through the logical channel.

The function of the RLC layer includes the concatenation, segmentation and reassembly of an RLC SDU. In order to guarantee various quality of services (QoS) required by a radio bearer (RB), the RLC layer provides three operating modes; a transparent mode (TM), an unacknowledged mode (UM) and an acknowledged mode (AM). AM RLC provides error correction through an automatic repeat request (ARQ).

A radio resource control (RRC) layer is defined only in the control plane. The RRC layer is related to the configuration, re-configuration and release of radio bearers and is responsible for control of the logical channel, transport channel and physical channels. An RB means a logical path provided by the first layer (PHY layer) and the second layer (MAC layer, RLC layer, and PDCP layer) for the transfer of data between a user equipment and a network.

The function of a packet data convergence protocol (PDCP) layer in the user plane includes the transfer, header compression and ciphering of user data. The function of a packet data convergence protocol (PDCP) in the control plane includes the transfer and ciphering/integrity protection of control plane data.

What an RB is configured means a process of defining the characteristics of a radio protocol layer and channel in order to provide a specific service and configuring each detailed parameter and operating method. An RB may be divided into two types of a signaling RB (SRB) and a data RB (DRB). The SRB is used as a passage for transmitting an RRC message in the control plane, and the DRB is used as a passage for transmitting user data in the user plane.

When an RRC connection is established between the RRC layer of a user equipment and the RRC layer of an E-UTRAN, the user equipment is in the RRC connected state. If not, the user equipment is in the RRC idle state.

A downlink transport channel through which a network transmits data to a user equipment includes a broadcast channel (BCH) through which system information is transmitted and a downlink shared channel (SCH) through which user traffic or a control message is transmitted. The traffic of a downlink multicast or broadcast service or a control message may be transmitted through a downlink SCH or may be transmitted through a separate downlink multicast channel (MCH). Meanwhile, an uplink the transport channel through a user equipment transmits data to a network includes a random access channel (RACH) through which an initial control message is transmitted and an uplink shared channel (SCH) through which user traffic or a control message is transmitted.

A logical channel located higher than a transport channel and mapped to the transport channel includes a broadcast control channel (BCCH), a paging control channel (PCCH), a common control channel (CCCH), a multicast control channel (MCCH), and a multicast traffic channel (MTCH).

A physical channel includes several OFDM symbols in the time domain and several subcarriers in the frequency domain. One subframe includes a plurality of OFDM symbols in the time domain. A resource block is a resource allocation unit and consists of a plurality of OFDM symbols and a plurality of subcarriers. Furthermore, each subframe may use specific subcarriers of specific OFDM symbols (e.g., first OFDM symbol) of the corresponding subframe for a physical downlink control channel (PDCCH), that is, an L1/L2 control channel. A transmission time interval (TTI) is a unit time of subframe transmission.

FIG. 4 is a diagram illustrating EMM and an ECM state in a wireless communication system to which the present invention may be applied.

Referring to FIG. 4, in order to manage the mobility of a user equipment in the NAS layer located in the control plane of the user equipment and the MME, an EMM registration state (EMM-REGISTERED) and an EMM deregistration state (EMM-DEREGISTERED) may be defined depending on whether the user equipment has been attached to or detached from a network. The EMM-REGISTERED state and the EMM-DEREGISTERED state may be applied to the user equipment and the MME.

At the initial stage, such as a case where a user equipment is first powered on, the user equipment is in the EMM-DEREGISTERED state. In order to access the network, the user equipment performs a process of registering with the corresponding network through an initial attach procedure. When the connection procedure is successfully performed, the user equipment and the MME make transition to the EMM-REGISTERED state. Furthermore, if the user equipment is powered off or a radio link fails (if a packet error rate exceeds a reference value on the radio link), the user equipment is detached from the network and makes transition to the EMM-DEREGISTERED state.

Furthermore, in order to manage a signaling connection between the user equipment and the network, an ECM connected state (ECM-CONNECTED) and an ECM idle state (ECM-IDLE) may be defined. The ECM-CONNECTED state and the ECM-IDLE state may also be applied to the user equipment and the MME.

An RRC state indicates whether the RRC layer of a user equipment and the RRC layer of a base station have been logically connected. That is, if the RRC layer of the user equipment and the RRC layer of the base station are connected, the user equipment is in the RRC connected state (RRC_CONNECTED). If the RRC layer of the user equipment and the RRC layer of the base station are not connected, the user equipment is in the RRC idle state (RRC_IDLE).

Case when ECM State is Associated with RRC State

The ECM connection includes an RRC connection established between the user equipment and the base station and an S1 signaling connection established between the base station and the MME. In other words, enabling/disabling the ECM connection means that both RRC connection and S1 signaling connection are enabled/disabled.

The network may determine the presence of user equipment in the ECM-CONNECTED & RRC-CONNECTED state on a cell-by-cell basis and may effectively control the user equipment.

In contrast, the network cannot check the presence of the user equipment in the ECM-IDLE state, and a core network (CN) manages the user equipment in a tracking area unit, that is, an area unit larger than a cell. When the user equipment is in the ECM idle state, the user equipment performs discontinuous reception (DRX) configured by NAS using an ID uniquely allocated in a tracking area. That is, the user equipment may receive the broadcasting of system information and paging information by monitoring a paging signal at a specific paging occasion every user equipment-specific paging DRX cycle.

Furthermore, when the user equipment is in the ECM-IDLE state, the network does not have context information of the user equipment. Accordingly, the user equipment in the ECM-IDLE state may perform a user equipment-based mobility-related procedure, such as cell selection or cell reselection, without a need to receive a command from the network. If the location of the user equipment in the ECM idle state is different from that known to the network, the user equipment may notify the network of the location of the corresponding user equipment through a tracking area update (TAU) procedure.

In contrast, when the user equipment is in the ECM-CONNECTED & RRC-CONNECTED state, the mobility of the user equipment is managed by a command from the network. In the ECM-CONNECTED state, the network is aware of a cell to which the user equipment belongs. Accordingly, the network may transmit and/or receive data to the user equipment or from the user equipment, may control mobility, such as handover of the user equipment, and may perform cell measurement for a neighboring cell.

As described above, in order for a user equipment to receive a common mobile communication service such as voice or data, the user equipment must shift to the ECM-CONNECTED & RRC-CONNECTED state. At the initial stage, such as a case where the user equipment is first powered on, the user equipment is in the ECM-IDLE state like the EMM state. When the user equipment is successfully registered with a corresponding network through an initial attach procedure, the user equipment and an MME make transition to the ECM connected state. Furthermore, if the user equipment has been registered with the network, but a radio resource has not been allocated because traffic has been deactivated, the user equipment is in the ECM-IDLE state. When uplink or downlink new traffic is generated in the corresponding user equipment, the user equipment and the MME make transition to the ECM-CONNECTED state through a service request procedure.

Case when ECM State is not Associated with RRC State

The ECM connection includes the RRC connection established between the user equipment and the base station and the S1 signaling connection established between the base station and the MME, but may be independent of the RRC state. That is, the ECM state between the user equipment and the MME may maintain the connected state even when the RRC state transitions from the connected state to the idle state.

Operations of the network/base station and user equipment in ECM-CONNECTED & RRC-CONNECTED state and ECM-IDLE state may be the same as operations in case when ECM state is associated with RRC state.

The network in the ECM-CONNECTED & RRC-IDLE state may perform the same operation as the operation in the ECM-CONNECTED state, but may manage the mobility of the user equipment in a specific unit including the base station and user equipment and may re-establish a connection (for example, S1 signaling connection, S1 data connection) path with MME/S-GW.

Therefore, the user equipment may perform different operations according to its state as follows.

ECM-IDLE: message transmission for ECM and RRC connection state transition

ECM-CONNECTED & RRC-IDLE (excluding RRC-IDLE of the user equipment due to radio link failure): message transmission for resuming RRC connection state transition and connection recommence ECM-CONNECTED & RRC-IDLE (RRC-IDLE of the user equipment due to radio link failure): message transmission for RRC connection re-establishment.

FIG. 5 is a diagram illustrating a bearer structure in a wireless communication system to which the present invention may be applied.

When a UE is connected to a Packet Date Network (PDN), a PDN connection is generated, and the PDN connection may also be called an EPS session. A PDN is an internet protocol network which is exterior or interior of a service provider, and provides a service function such as an internet or IP Multimedia Subsystem (IMS).

The EPS session has one or more EPS bearer. The EPS bearer is the transmission path of traffic generated between a user equipment and a PDN GW in order for the EPS to transfer user traffic. One or more EPS bearers may be configured per user equipment.

Each EPS bearer may be divided into an E-UTRAN radio access bearer (E-RAB) and an S5/S8 bearer. The E-RAB may be divided into a radio bearer (RB) and an S1 bearer. That is, the EPS bearers correspond to the RB, S1 bearer, and S5/S8 bearer, respectively.

The E-RAB transfers the packet of an EPS bearer between a user equipment and an EPC. If the E-RAB is present, the E-RAB bearer and the EPS bearer are mapped in a one-to-one manner. A data radio bearer (DRB) transfers the packet of the EPS bearer between the user equipment and an eNB. If the DRB is present, the DRB and the EPS bearer/E-RAB are mapped in a one-to-one manner. The S1 bearer transfers the packet of the EPS bearer between the eNB and the S-GW. The S5/S8 bearer transfers an EPS bearer packet between the S-GW and the P-GW.

The user equipment binds a service data flow (SDF) to the EPS bearer of an uplink direction. The SDF is an IP flow or a gathering of IP flows in which user traffic has been classified (or filtered) for each service. A plurality of SDFs may be multiplexed with the same EPS bearer by including a plurality of uplink packet filters. The user equipment stores mapping information between an uplink packet filter and a DRB in order to bind the SDF and the DRB in the uplink.

The P-GW binds the SDF to the EPS bearer in a downlink direction. The plurality of SDFs may be multiplexed with the same EPS bearer by including a plurality of downlink packet filters. The P-GW stores mapping information between the downlink packet filters and the S5/S8 bearer in order to bind the SDF and the S5/S8 bearer in the downlink.

The eNB stores one-to-one mapping between the DRB and the S1 bearer in order to bind the DRB and the S1 bearer in the uplink/downlink. The S-GW stores one-to-one mapping information between the S1 bearer and the S5/S8 bearer in order to bind the S1 bearer and the S5/S8 bearer in the uplink/downlink.

The EPS bearer is divided into two types of a default bearer and a dedicated bearer. A user equipment may have one default bearer or one or more dedicated bearers per PDN. The least default bearer having an EPS session with respect to one PDN is called a default bearer.

The EPS bearer may be classified based on an identity. The EPS bearer identity is allocated by a user equipment or an MME. The dedicated bearer(s) is combined with a default bearer by a linked EPS bearer identity (LBI).

When a user equipment is initially attached to a network through an initial attach procedure, it receives an IP address allocated thereto and thus a PDN connection is generated. A default bearer is generated at the EPS interval. The default bearer is maintained without being released unless the PDN connection with the user equipment is terminated although there is no traffic between the user equipment and a corresponding PDN. When the corresponding PDN connection is terminated, the default bearer is also released. In this case, all of bearers in the interval forming a default bearer with the user equipment are not activated, but an S5 bearer having a direct connection with the PDN is maintained and E-RAB bearers (i.e., DRB and S1 bearer) associated with a radio resource are released. Furthermore, when new traffic is generated in the corresponding PDN, an E-RAB bearer is reconfigured to transfer traffic.

While a user equipment uses a service (e.g., Internet) through a default bearer, if the user equipment uses a service (e.g., video on demand (VoD)) insufficient to receive quality of service (QoS) using only the default bearer, a dedicated bearer when the user equipment demands the dedicated bearer. If there is no traffic of the user equipment, the dedicated bearer is released. A user equipment or a network may generate a plurality of dedicated bearers, if necessary.

An IP flow may have a different QoS characteristic depending on that a user equipment uses which service. When a network establishes/modifies an EPS session for the user equipment, it determines a control policy for the allocation of a network resource to QoS and applies it while the EPS session is maintained. This is called policy and charging control (PCC). A PCC rule is determined based on an operator policy (e.g., QoS policy, a gate status and a billing method).

The PCC rule is determined in an SDF unit. That is, an IP flow may have a different QoS characteristic depending on a service used by a user equipment. IP flows having the same QoS are mapped to the same SDF, and the SDF becomes a unit in which the PCC rule is applied.

A policy and charging control function (PCR) and a policy and charging enforcement function (PCEF) may correspond to main entities that perform such a PCC function.

The PCRF determines a PCC rule for each SDF when an EPS session is generated or changed and provides it to a P-GW (or PCEF). The P-GW configures the PCC rule for a corresponding SDF, detects an SDF every transmitted/received IP packet, and applies the PCC rule for the corresponding SDF. When the SDF is transmitted to a user equipment via the EPS, it is mapped to an EPS bearer capable of providing proper QoS according to a QoS rule stored in the P-GW.

The PCC rule is divided into a dynamic PCC rule and a pre-defined PCC rule. The dynamic PCC rule is dynamically provided from the PCRF to the P-GW when the EPS session is established/modified. In contrast, the pre-defined PCC rule is previously configured in the P-GW and activated/deactivated by the PCRF.

An EPS bearer is a basic QoS parameter and includes a QoS class identifier (QCI) and an allocation and retention priority (ARP).

The QCI is a scalar used as a criterion for accessing node-specific parameters that controls bearer level packet forwarding treatment. A scalar value is pre-configured by a network operator. For example, the scalar may be pre-configured as one of integer values 1 to 9.

A main object of an ARP is for determining whether the establishment or modification request of a bearer has to be accepted or rejected if a resource is restricted. Furthermore, the ARP may be used to determine whether which bearer(s) has to be dropped by an eNB in an exceptional resource restriction (e.g., handover) situation.

The EPS bearer is divided into a guaranteed bit rate (GBR) type bearer and a non-guaranteed bit rate (non-GBR) bearer according to a QCI resource form. A default bearer may be always a non-GBR type bearer, and a dedicated bearer may be a GBR type or non-GBR type bearer.

The GBR type bearer is a QoS parameter other than the QCI and the ARP and has the GBR and a maximum bit rate (MBR). The MBR means that a resource fixed for each bearer is allocated (guarantee a bandwidth). In contrast, the non-GBR type bearer is a QoS parameter other than the QCI and the ARP and has an aggregated MBR (AMBR). The AMBR means that a maximum bandwidth capable of being used along with another non-GBR type bearer is allocated without allocating a resource for a bearer.

If the QoS of the EPS bearer is determined as described above, the QoS of each bearer is determined for each interface. The bearer of each interface provides the QoS of the EPS bearer for each interface, and thus all of the EPS bearer, an RB, and S1 bearer have a one-to-one relation.

While a user equipment uses a service through a default bearer, if the user equipment uses a service incapable of receiving QoS using only the default bearer, a dedicated bearer is generated in response (on-demand) to a request from the user equipment.

FIG. 6 is a diagram illustrating the transmission path of a control plane and a user plane in an EMM registration state in a wireless communication system to which the present invention may be applied.

FIG. 6(a) illustrates an ECM-CONNECTED state, and FIG. 16(b) illustrates ECM-IDLE.

When a user equipment becomes the EMM-Registered state by successfully attaching to a network, it is provided with a service using an EPS bearer. As described above, the EPS bearer is divided into a DRB, an S1 bearer, and an S5 bearer for each interval.

As in FIG. 6(a), in the ECM-CONNECTED state having user traffic, an NAS signaling connection, that is, an ECM connection (i.e., RRC connection and S1 signaling connection), is established. Furthermore, an S11 GPRS tunneling protocol control plane (GTP-C) connection is established between the MME and SGW, and an S5 GTP-C connection is established between the SGW and the PDN GW.

Furthermore, in the ECM-CONNECTED state, all of the DRB, the S1 bearer and the S5 bearer are configured (i.e., radio or network resource allocation).

As in FIG. 6(b), in the ECM-IDLE state not having user traffic, the ECM connection (i.e., RRC connection and S1 signaling connection) is released. In this case, the establishment of the S11 GTP-C connection between the MME and the SGW and the establishment of the S5 GTP-C connection between the SGW and the PDN GW are maintained.

Furthermore, in the ECM-IDLE state, both the DRB and the S1 bearer are released, but the configuration (i.e., radio or network resource allocation) of the S5 bearer is maintained.

FIG. 7 is a flow chart showing one example of a tracking area update procedure (TAU) in a wireless communication system where the present invention may be applied.

Referring to FIG. 7, when the TAU timer of the user equipment in the ECM-IDLE state elapses or the user equipment moves to another tracking area, the user equipment initiates the TAU procedure to report the tracking area (TA) to the MME.

The user equipment initiates the TAU procedure by transmitting a TAU request message to the MME through the base station (S7010).

The TAU request message is included and transferred in the RRC Connection Setup Complete message when the RRC connection is established, and is included and transferred in the Initial UE message when the S1 signaling connection is established.

When the MME receiving the TAU request message differs from a previous node (that is, serving MME or previous SGSN) (that is, when the MME has changed), a new MME (target MME) transmits a context request message to the serving MME (or previous SGSN) to obtain information about the user equipment from the serving MME (or previous SGSN).

When the context request message is transmitted to the serving MME (or previous SGSN), the serving MME (or the previous SGSN) sends a context response message including information on the user equipment (S7020).

The user equipment and target MME and HSS perform the authentication function and Security (or Ciphering) procedure.

The target MME transmits a Context Acknowledge message to the serving MME to inform that the information about the user equipment has been transmitted (S7030).

When the target MME selects the target S-GW, the target MME transfers change indication information of the S-GW to the serving MME (or the previous SGSN) using the context acknowledge message. The change indication information of the S-GW indicates that a new S-GW has been selected.

Thereafter, the target MME decides whether to relocate the S-GW. When the S-GW is no longer able to provide services to the UE, the S-GW is relocated. Further, the target MME may decide to relocate the S-GW when the new S-GW provides the service to the UE for a longer time and/or a P-GW path is more suitable for the user equipment, or the target S-GW is co-located with the P-GW.

When the target MME has selected a new S-GW, the target MME transmits a Create Session Request message to the selected target S-GW based on the PDN connection (S7040).

If necessary, the target S-GW transmits a Modify Bearer Request message to the PDN-GW based on the PDN connection (S7050).

If necessary, the PDN-GW may perform a PCRF and an IP connectivity access network (IP-CAN) session modification procedure (S7060).

When the PDN-GW receives the Modify Bearer Request message from the target S-GW, the PDN-GW transmits a Modify Bearer Response message to the target S-GW (S7070).

The target S-GW updates its bearer context. Thus, when the target S-GW receives a bearer PDU from the base station, the target S-GW may route the bearer PDU to the P-GW.

The target S-GW transmits a Create Session Response message to the target MME in a response to the Create Session Request (S7080).

At this time, the target S-GW transfers a temporary IP address and TEID allocated for the downlink data transfer to the target MME using the Create Session Response message.

The target MME transmits an Update Location Request message to the HSS (S7090).

The HSS transmits a Cancel Location message to the serving MME (or previous SGSN) (S7100).

The serving MME or the previous SGSN transmits a location cancel acknowledge message to the HSS in a response to the location cancel message in step S7110.

When the previous SGSN receives the context acknowledge message and the user equipment is connected thereto through an Iu interface, the previous SGSN transmits an Iu release command message to the RNC (S7120).

The RNC transmits an Iu Release Complete message to the previous SGSN in a response to the Iu Release Command message (S7130).

The HSS transmits an Update Location Acknowledge message to the target MME in a response to the Update Location Request message (S7140).

When an S-GW change indication is received within the Context Acknowledge message in the step S7030, the serving MME/previous SGSN releases the MME or SGSN EPS bearer resource by transmitting a Delete Session Request message to the S-GW (S7150).

At this time, the serving MME/previous SGSN transfers the temporary IP address and TEID allocated for downlink data transfer to the previous S-GW using a Delete Session Request message.

Upon receipt of the Delete Session Request message, the S-GW transmits a Delete Session Response message to the serving MME/previous SGSN (S7160).

The target MME transmits a TAU Accept message to the user equipment (S7170). At this time, when the target MME allocates a new GUTI (Globally Unique Temporary Identity) to the user equipment, the allocated GUTI may be included in the TAU Accept message.

When the GUTI is included in the TAU Accept message, the user equipment transmits, upon receipt of the TAU Accept message, a TAU Complete message to the target MME (S7180).

The present invention proposes a method for transmitting information about a changed MME to other MMEs in when the MME is changed in the TAU procedure.

FIG. 8 shows one example of parameter configuration for QoS (Quality of Service) management.

Referring to FIG. 8, the wireless communication system applies QoS policy on the SDF (Service Data Flow) basis and on the EPS bearer basis. The SDF (Service Data Flow) includes one or more IP flows as classified based on the service type. The EPS bearer acts as a logical path along which one or more SDFs are transmitted. That is, the QoS of the data to be transmitted/received may be managed by the following QoS parameters.

Resource type: bandwidth guaranteed type and non-guaranteed type

Guaranteed bit rate (GBR): Guaranteed minimum bandwidth

Maximum bit rate (MBR): Maximum bandwidth as allowed

Access point name-Aggregate Maximum Bit Rate (APN-AMBR): Maximum bandwidth allowed per APN UE-AMBR: maximum bandwidth allowed per user equipment When a packet inflows in a manner exceeding the bandwidth specified in the MBR, APN-AMBR, and UE-AMBR QoS parameters, each entity mentioned below discards overflowed packets.

Rate Policing for Downlink Data

First: the P-GW discards a quantity of the incoming packets in excess of the MBR for each SDF.

Second: the P-GW discards a quantity of packets in excess of the MBR for one or more SDFs which have been introduced into each GBR EPS bearer and discards a quantity of packets exceeding the APN-AMBR for one or more SDFs which have been introduced into all non-GBR EPS bearers.

Third: the base station discards a quantity of packets exceeding the UE-AMBR for one or more SDFs that have been introduced into all No-GBR EPS bearers.

Rate Policing for Uplink Data

First: the user equipment discards a quantity of packets in excess of MBR (GBR) and APN-AMBR (Non-GBR).

Second: The base station discards a quantity of packets in excess of MBR (GBR) and UE-AMBR (Non-GBR).

Third: the P-GW discards a quantity of packets in excess of the APN-AMBR for one or more SDFs which have been introduced in all Non-GBR EPS bearers and discards a quantity of packets in excess of the MBR for each SDF.

The QoS parameters as described above may be applied to each of the user equipments. In this way, the amount of packets in excess of the QoS parameters that may be applied to each user equipment are discarded. Further, there is a limit in improvement of the data transmission rate of each user equipment using QoS parameters of each user equipment.

Thus, to solve the problem in accordance with the present invention, a data boosting control method is provided in which a service is received from the same gateway using a number of communication devices included in one wireless device.

The data boosting method described herein may be interpreted as a method of increasing the data transmission rate by receiving a service using one or more communication devices included in one wireless device.

The communication devices included in the wireless device share a specific layer of the wireless device, as described below.

FIG. 9 is a block diagram of one example of a radio protocol architecture for a wireless device to which the present invention may be applied.

A wireless device as described herein may also refer to a user platform that includes one or more communication devices.

The communication device may also refer to a communication modem itself, which may be implemented to communicate with externals. Alternatively, the communication device may refer to a device including the communication modem.

That is, the wireless device may refer to a device that includes communication devices with the same or different Radio Access Technologies (RATs).

Thus, the communication device may be exchanged with a wireless user equipment, a communication modem, or the like.

Further, the wireless device may refer to a UE defined in 3GPP. However, it may be desirable for the wireless device to be interpreted beyond the UE defined in 3GPP. That is, the wireless device may be a vehicle, and so on in one example.

Further, the communication device may include a first communication device and one or more second communication devices.

The first communication device may refer to a communication device in the same user platform that first accesses the network. The first communication device may be referred to as a master user equipment, a special user equipment, a primary user equipment, or a first user equipment.

Hereinafter, the first communication device will be abbreviated as a S (special)-UE.

Further, the second communication device refers to a communication device that subsequently (or after the access of the first communication device) accesses the network. The second communication device may be referred to as slave user equipment, virtual user equipment, secondary user equipment, second user equipment, or the like.

Hereinafter, the second communication device will be abbreviated as a V (Virtual)-UE.

That is, the second communication device means a communication device that additionally accesses the network when the S-UE is already present in the same user platform.

Further, the communication devices within the user platform may share an application layer, a transmission layer and a network layer, as shown in FIG. 9(a).

At this time, when the user platform transmits uplink data to the base station using multiple communication devices, adaptation in the network layer plays a role in determining which communication device transmits the uplink data. That is, the adaptation determines a routing path for the uplink data.

Further, each communication device may individually include an NAS layer, an RRC layer, a MAC layer, an RLC layer, a PDCP layer and a PHY layer, as shown in FIG. 9(b).

The layers that constitute the user platform may be physically located at the same location or in a distributed manner.

At this time, when the S-UE transitions to the idle state, one V-UE among the V-UEs may act as an S-UE.

When, as described above, a plurality of communication devices are included in one user platform, each communication device may individually access the network to transmit/receive data.

Here, the majority of communication devices may use the same RAT or different RATs.

However, since the communication devices in the user platform are allocated different IP addresses, the communication devices may not receive the same service from the same gateway.

Thus, even when the user platform includes the multiple communication devices, the user platform may not exceed a maximum data transmission rate based on the QoS parameter of each communication device.

Therefore, in the following, there is disclosed a method for allocating the same IP address to the communication devices in the same user platform, thereby to increase the data transmission rate using the plurality of communication devices. That is, a data boosting method will be described.

FIG. 10 shows one example of a data transmission/reception method between a user platform and a base station to which the present invention may be applied.

In FIG. 10, it may be assumed that the S-UE and V-UE are allocated the same IP address.

A service server transmits data related to a service provided by the service server to a gateway of a cellular network over the Internet network.

The cellular network may include the base station, and the gateway.

The gateway may include at least one of the S-GW or P-GW.

The gateway transmits to the base station the downlink data to be transmitted to the communication device in the user platform. Then, the base station transmits the received downlink data to at least one communication device of the user platform.

At this time, since the S-UE and the V-UE have the same IP address, the user platform may receive the downlink data from the gateway using the two UEs (S-UE, V-UE) included in the user platform rather than using only one UE.

The downlink data as transmitted from the gateway is transmitted to the user platform through the base station.

Here, the base station does not know that the S-UE and V-UE constitute the single user platform. Therefore, the base station plays only a role in transferring the downlink data as transmitted from the gateway to the S-UE and V-UE.

That is, when the gateway allocates the same IP address to the S-UE and the V-UE and transmits the data to the user platform using the allocated IP address as a destination address. Thus, the V-UE as well as the S-UE may receive the data. This may improve the data transmission rate.

At this time, the S-UE and V-UE may act as user equipments linked to each other.

Here, the linked user equipments may refer to user equipments that are included in the same user platform and share the upper layer (application layer, transmission layer, network layer) of the user platform.

The communication devices (e.g., S-UE, V-UE) constituting the user platform communicate with the network entity (e.g., base station, MME, etc.) in the network using the same communication protocol.

The network entity or network node processes each of the communication devices (S-UE, V-UE) constituting the user platform independently or individually using the same protocol.

Further, since each of the communication device constituting the same user platform must communicate with the cellular network, each communication device must be individually subscribed to the cellular network. That is, the user platform must be subscribed to the network times corresponding to the total number of communication devices that constitute the user platform.

In this way, the methods proposed herein may use a number of the mutually-linked communication devices included in the same user platform to receive the same service, thereby improving the data transmission rate.

FIG. 11 shows one example of parameter configuration for Quality of Service (QoS) management.

In order to improve the data transmission rate associated with the service from the specific user platform by allocating the same IP address to the plurality of the mutually-linked communication devices within the specific user platform, separate rate policing should be applied as shown in FIG. 11.

As shown in FIG. 11, SDF 1 is transmitted to V-UE and S-UE via two Default Bearers, while SDF 2 is transmitted to V-UE and S-UE via two dedicated bearers.

That is, multiple paths to different communication devices may be present for one SDF. Considering this, the following rate policing should be applied.

The rate policing to be considered for the data boosting proposed in this specification will be described.

First, the operations of the gateway may be divided into an operation related to the SDF and an operation related to the logical paths (for example, EPS Bearer, etc.) for data transmission/reception.

The gateway operates with a maximum bit rate (MBR) considering the multiple paths mapped to each SDF.

For example, the MBR may refer to the sum of the MAX Bit Rates of all user equipments, each of which maps to one SDF to constitute the multi-paths.

Further, the gateway distributes the downlink data so that the distribution rate does not exceed the QoS parameters (for example, MBR, APN-AMBR, and UE-AMBR) of each user equipment constituting the multi-paths.

Next, the user platform sublayer operation (adaptation) may be associated with the data logical path.

That is, the sublayer of the user platform operates to distribute the uplink data so that the distribution rate does not exceed the MBR and APN-AMBR of each of the user equipment constituting the multiple paths.

As described above, in the method proposed in the present specification, the separate rate policing may be applied to a plurality of communication devices allocated with the same IP address. As a result, the data transmission rate of the service provided to the user platform may be improved as compared with the case of receiving data using one communication device.

Further, allocating the same IP address to the mutually-linked user equipments and transmitting/receiving the data using the same IP address may allow the data transmission rate to be improved. As a result, this may meet the requirements for service (for example, data throughput, etc.) as required by next-generation mobile communication standards without changing the network in the legacy LTE technology.

That is, according to the present invention, a number of user equipments constituting the user platform may be mutually linked. Further, the same IP address may be allocated to the user equipments to improve data throughput without changing an interface between the user equipment based on the LTE technology and the base station, and an interface between the user equipment and the MME.

Further, the same IP address may be allocated by a procedure for establishing a session between MMEs that manage a plurality of mutually-linked user equipments. This may establish the session for each data transmission/reception using the same IP address.

That is, when the MME receives a message requesting the session establishment from the user equipment, the MME informs the MMEs managing further user equipments linked with the user equipment that that the request message has been receive. Thus, in the session establishment procedure, the same IP address may be allocated to the mutually linked user equipments.

There is no interface change between base station and user equipment in order to allocate the same IP address while establishing each session.

Thus, the base station does not know that user equipments has the same IP address and are linked with each other. Rather, the core stage may store and manage information about the subscriber, and information about the user equipment of a HSS.

Using this method, the user equipments have the same IP address, and, thus, data to provide the same service may be received via the multiple user equipment. Since the multiple user equipments receive the data to provide the same service, data throughput may be improved.

Further, this approach may simultaneously and collectively activate the plurality of user equipments constituting the single user platform by using the paging message.

To this end, each MME that manages each user equipment must be able to recognize MMEs that manage further user equipments that are linked to the user equipment that each MME manages.

That is, this approach should create multiple paths to transmit/receive data using the multiple user equipments that constitute one user platform. Further, the MMEs that manage the mutually-linked user equipments must mutually recognize each other in order to activate the multiple user equipments simultaneously and collectively using the paging message.

However, When the TA changes due to the movement of a corresponding user equipment and, hence, the MME that manages the user equipment changes, this change may not be recognized by the MMEs that manage further user equipment linked with the corresponding user equipment.

Thus, according to the present invention, a method and device are proposed which allow MMEs that manage further user equipment linked with the corresponding user equipment to recognize the changed MME when the TA of the corresponding user equipment is changed and, hence, the MME managing the corresponding UE is changed.

FIG. 12 is a flow-chart showing one example of a method for transmitting information about the changed MME to which the present invention may be applied.

Referring to FIG. 12, MMEs changed according to the updated location of the user equipment transmit context information about the corresponding user equipment, and information about the changed MME to MMEs managing further user equipments linked with the corresponding user equipment. Thereby, the MMEs managing the linked further user equipments may recognize that the corresponding MME has been changed.

First, S12010 step and S12020 steps are the same as S7010 step and S7020 in FIG. 7 respectively. Therefore, the description of the above steps will be omitted.

At this time, the context information regarding the corresponding user equipment as transmitted from the serving MME to the target MME using the context response message may include the following information: information (for example, user equipment identifier (ID), IMSI/GUTI, etc.) about at least one user equipment linked with the corresponding user equipment, Information (for example, MME identifier, etc.) about the MMEs managing the at least one UE, a gateway identifier for identifying a gateway assigned to the corresponding user equipment, and a session identifier indicating a session established between the corresponding user equipment and the gateway.

The user equipment and target MME and HSS perform the authentication function and Security (or Ciphering) procedure.

The target MME transmits a Context Acknowledge message to the serving MME to inform that the information about the user equipment has been transmitted (S12030).

The target MME may recognize at least one user equipment linked with the corresponding user equipment, and at least one MME managing the at least one UE using the context information about the corresponding user equipment as transmitted from the serving MME.

The target MME transmits a change message informing the change of the MME to at least one MME recognized using the context information about the corresponding user equipment (S12040).

The change message may include the following information: information about the changed MME, information about at least one user equipment linked with the corresponding user equipment, and information about at least one MME managing the at least one UE.

Hereinafter, steps S12050 to S12190 are the same as steps S7040 to S7180 in FIG. 7, respectively. Thus, the description of these steps will be omitted.

Using this method, when the MME change occurs according to the updated location of the corresponding user equipment, the MMEs managing one or more user equipments linked to the corresponding user equipment may recognize the change of the MME using the information as transmitted from the changed MME.

FIG. 13 is a flow-chart showing another example of a method for transmitting information about the changed MME to which the present invention may be applied.

Referring to FIG. 13, the MME that has been changed according to the updated location of the user equipment may transmit to the MMEs managing further user equipments linked with the corresponding user equipment, the context information about the corresponding user equipment, and the information about the changed MME at a time point different from a time point as described in FIG. 12. Thereby, the MMEs managing the linked further user equipments may recognize that the MME has been changed.

First, S13010 step to S13080 step are the same as S7010 step to S7080 of FIG. 7, and the description of these steps is omitted.

At this time, in step S13020, the context information regarding the corresponding user equipment as transmitted to the target MME using the context response message from the serving MME may include: information (for example, user equipment identifier (ID), IMSI/GUTI, etc.) regarding at least one user equipment linked with the corresponding user equipment, information (for example, MME identifier, etc.) about the MME managing the at least one UE, a gateway identifier for identifying the gateway allocated to the corresponding user equipment, and a session identifier indicating a session established between the user equipment and the gateway.

The target MME may recognize at least one user equipment linked with the corresponding user equipment, and at least one MME managing the at least one UE using the context information about the corresponding user equipment as transmitted from the serving MME.

In step S13080, the target MME may receive the session creation response message from the target S-GW. Then, the target MME may transmit a change message informing the change of the MME to at least one MME recognized using the context information about the corresponding user equipment (S13090).

The change message may include the following information: information about the changed MME, information about at least one user equipment linked with the corresponding user equipment, and information about at least one MME managing the at least one UE.

Hereinafter, steps S13100 to S13190 are the same as steps S7090 to S7180 in FIG. 7, respectively. Thus, the description of these steps will be omitted.

FIG. 14 is a flow-chart showing still another example of a method for transmitting information about the changed MME to which the present invention may be applied.

Referring to FIG. 14, when the MME has been changed according to the updated location of the user equipment, the HSS may transmit to the MMEs managing further user equipments linked with the corresponding user equipment, the context information about the corresponding user equipment, and the information about the changed MME. Thereby, the MMEs managing the linked further user equipments may recognize that the MME has been changed.

First, S14010 step to S14090 step are the same as S7010 step to S7090 of FIG. 7, and the description of these steps is omitted.

At this time, in step S14020, the context information regarding the corresponding user equipment as transmitted to the target MME using the context response message from the serving MME may include: information (for example, user equipment identifier (ID), IMSI/GUTI, etc.) regarding at least one user equipment linked with the corresponding user equipment, information (for example, MME identifier, etc.) about the MME managing the at least one UE, a gateway identifier for identifying the gateway allocated to the corresponding user equipment, and a session identifier indicating a session established between the user equipment and the gateway.

The target MME may recognize at least one user equipment linked with the corresponding user equipment, and at least one MME managing the at least one UE using the context information about the corresponding user equipment as transmitted from the serving MME.

Further, in step S14090, a location updating request message transmitted from the target MME may include information (for example, user equipment identifier (ID), IMSI/GUTI, etc.) regarding at least one user equipment linked with the corresponding user equipment, and information (for example, MME identifier, etc.) about the MME managing the at least one UE.

The HSS may recognize the at least one user equipment linked to the corresponding user equipment, and the at least one MME managing the at least one user equipment based on the context information about the corresponding user equipment.

The HSS may update the context information on the corresponding user equipment based on the information included in the location updating request message received in step S14090.

Since the MME has changed according to the updated location of the corresponding user equipment, the HSS transmits the change message to the at least one MME which manages at least one user equipment linked with the corresponding user equipment in order to notify the at least one MMEs of the change of the MME (S14100).

The change message may include the following information: information about the changed MME, information about at least one user equipment linked with the corresponding user equipment, and information about at least one MME managing the at least one UE.

Hereinafter, steps S14100 to S14190 are the same as steps S7100 to S7180 in FIG. 7, respectively. Thus, the description of these steps will be omitted.

FIG. 15 is a flow chart showing still another example of a method for transmitting information about a changed MME to which the present invention may be applied.

Referring to FIG. 15, when the MME has been changed in a tracking area updating procedure without the change of the S-GW, the changed MME transmits context information about the corresponding user equipment and information about the changed MME to the MMEs managing further user equipments linked with the corresponding user equipment. Thereby, the MMEs managing the linked further user equipments may recognize that the MME has been changed.

First, S15010 step to S15030 step are the same as S7010 step to S7030 of FIG. 7, and the description of these steps is omitted.

At this time, in step S15020, the context information regarding the corresponding user equipment as transmitted to the target MME using the context response message from the serving MME may include: information (for example, user equipment identifier (ID), IMSI/GUTI, etc.) regarding at least one user equipment linked with the corresponding user equipment, information (for example, MME identifier, etc.) about the MME managing the at least one UE, a gateway identifier for identifying the gateway allocated to the corresponding user equipment, and a session identifier indicating a session established between the user equipment and the gateway.

The target MME may recognize at least one user equipment linked with the corresponding user equipment, and at least one MME managing the at least one UE using the context information about the corresponding user equipment as transmitted from the serving MME.

Since the serving S-GW has not been changed due to the tracking area updating, the target MME transmits the Modify Bearer Request message, not the session creation request message, to the serving S-GW (S15040).

If necessary, the serving S-GW transmits the received bearer request message to the PDN-GW (S15050). The PDN-GW performs a PCRF and an IP-CAN session modify procedure (S15060).

The PDN-GW transmits the Modify Bearer Response message to the serving S-GW in a response to the bearer request message (S15070). The serving S-GW transmits the Modify Bearer response message to the target MME (S15080).

At this time, the serving S-GW transfers the temporary IP address and TEID allocated for the downlink data transfer to the target MME using the bearer modify response message.

The target MME transmits the Update Location Request message to the HSS (S15090).

The HSS transmits the Cancel Location message to the serving MME (or previous SGSN) (S15100).

The serving MME (or previous SGSN) transmits the Cancel Location Acknowledge message to the HSS in a response to the Cancel Location message (S15110).

Upon receipt of the Update Location Request message, the HSS transmits the Update Location Acknowledge message to the target MME (S15120).

In step S15020, the target MME transmits the change message informing the at least one MMEs recognized using context information about the corresponding user equipment of the change of the MME (S15130).

The change message may include information about the changed MME, information about at least one user equipment (UE) linked with the corresponding user equipment, and information about at least one MMEs managing the at least one UE.

The target MME transmits the TAU Accept message to the user equipment (S15140). At this time, when the target MME allocates a new GUTI (Globally Unique Temporary Identity) to the user equipment, the allocated GUTI may be included in the TAU Accept message.

When the GUTI is included in the TAU Accept message, the user equipment transmits the TAU Complete message to the target MME in a response to the TAU Accept message (S15150).

Using this method, when the MME has been changed in the tracking area update procedure in which the serving S-GW is not changed, the MMEs managing one or more user equipments linked with the user equipment may recognize the change of the MME using the information as transmitted from the changed MME.

FIG. 16 is a flow-chart showing one example of a method for transmitting information about the changed MME by the changed MME to which the present invention may be applied.

Referring to FIG. 16, when the MME changes according to the updated location of the user equipment, the MME as changed may inform the MMEs managing the user equipments linked with the corresponding user equipment, which are recognized using the information transmitted from the user equipment, of the MME of the change.

Specifically, when the TAU timer of the user equipment in the ECM-IDLE state elapses or the user equipment moves to another tracking area, the TAU procedure may be initiated by the user equipment to report the tracking area (TA) to the MME.

When the TAU procedure is started, a new MME (hereinafter referred to as a first MME) may receive the tracking area update message from the user equipment via the base station (S16010).

The tracking area updating message may include MME information about the changed MME (hereinafter referred to as second MME). The MME information may include identification information of the second MME.

Upon receiving the tracking area updating message, the first MME may recognize the second MME using the MME information. Then, the first MME may send a context request message requesting context information about the user equipment to the second MME (S16020).

The context information about the user equipment may include the following information, as described in FIGS. 12 to 15: Information (for example, user equipment identifier (ID), IMSI/GUTI, etc.) regarding at least one user equipment linked with the corresponding user equipment, information (for example, MME identifier, etc.) about the MME managing the at least one UE, a gateway identifier for identifying a gateway assigned to the user equipment, and a session identifier indicating the established session between the user equipment and the gateway.

At this time, the same IP address may be allocated to the corresponding user equipment, and the at least one user equipment linked to the corresponding user equipment.

The first MME may receive the context response message from the second MME in response to the context request message. The response message may include the context information about the corresponding user equipment.

Upon recognizing at least one user equipment linked with the corresponding user equipment and at least one MMEs managing the at least one user equipment using the context information about the user equipment, the first MME transmits a message to the at least one MME to inform that the MME managing the corresponding user equipment has changed from MME 2 to MME 1.

At this time, the message to inform that the MME managing the user equipment has been changed from the MME 2 to the MME 1 is the same as the change message as described in FIG. 12, FIG. 13, and FIG. 15. Thus, the former message may be transmitted at the same time when the latter change message is transmitted.

Using this method, even when the MME has been changed, the MMEs managing the user equipments linked with the corresponding user equipment may recognize the change of the MME. Thereby, the MMEs managing the user equipments linked with the corresponding user equipment recognize the change of the MME. Thus, even when the MME is changed, multi-paths for transmitting/receiving data for providing the same service may be created using the corresponding user equipment and the user equipments linked with the corresponding user equipment. This may increase the data transmission rate.

Further, the MMEs managing the user equipments linked with the corresponding user equipment recognize the change of the MME. Thus, even when the MME is changed, the corresponding user equipment, and the user equipments linked with the corresponding user equipment may be activated collectively and simultaneously using the paging message.

In addition to the steps as described in FIG. 16, the steps as described in FIG. 12, FIG. 13 and FIG. 15 may be performed for the TAU procedure.

FIG. 17 is a flow-chart showing one example of a method for transmitting information about the changed MME by the HSS to which the present invention may be applied.

Referring to FIG. 17, when the MME is changed according to the updated location of the corresponding user equipment, the HSS may inform the MMEs managing the user equipments linked with the corresponding user equipment of the change in the MME.

Specifically, when the TAU timer of the corresponding user equipment in the ECM-IDLE state has elapsed or the corresponding user equipment has moved to another tracking area, the TAU procedure is initiated by the corresponding user equipment.

When the TAU procedure is started, the HSS receives the location updating message from the first MME (S17010).

The location updating message may include the following: user equipment identification information indicating the corresponding user equipment, and first MME identifying information indicating the first MME, and second MME identification indicating the MME as changed (hereinafter referred to as second MME).

A MME managing which user equipment, among the corresponding user equipment and the one or more user equipments linked to the corresponding user equipment constituting the user platform may be recognized using the location updating message.

After the HSS recognizes the change of the MME, the HSS may transmit the location cancel message requesting the HSS to cancel the location registration of the corresponding user equipment to the second MME. In a response, the HSS receives the location cancel acknowledge message (S17020, S17030).

In a response to the location updating message in step S17010, the HSS transmits the location updating acknowledge message to the first MME indicating that the location of the corresponding user equipment has been updated (S17040).

The HSS has recognized using the received location updating message in step S17010 that the MME managing the corresponding user equipment has been changed. Thus, the HSS sends a message to at least one MMEs managing at least one user equipment linked with the corresponding user equipment to inform that the MME managing the user equipment has changed from MME 2 to MME 1.

At this time, the message for notifying that the MME managing the user equipment is changed from the MME 2 to the MME 1 is the same as the change message as described in FIG. 14. Thus, the former message may be transmitted at the same time when the latter change message is transmitted.

Using this method, even when the MME has been changed, the MMEs managing the user equipments linked with the corresponding user equipment may recognize the change of the MME. Thereby, the MMEs managing the user equipments linked with the corresponding user equipment recognize the change of the MME. Thus, even when the MME is changed, multi-paths for transmitting/receiving data for providing the same service may be created using the corresponding user equipment and the user equipments linked with the corresponding user equipment. This may increase the data transmission rate.

Further, the MMEs managing the user equipments linked with the corresponding user equipment recognize the change of the MME. Thus, even when the MME is changed, the corresponding user equipment, and the user equipments linked with the corresponding user equipment may be activated collectively and simultaneously using the paging message.

In addition to the steps as described in FIG. 17, the steps as described in FIG. 14 may be performed for the TAU procedure.

FIG. 18 is a diagram illustrating an inner block diagram of a wireless device to which the present invention may be applied.

Here, the wireless device may be an eNB and a UE, and the eNB includes both of a macro eNB and a small eNB.

As shown in FIG. 18, the eNB 1810 and the UE 1820 include communication units (transmitting/receiving units, RF units, 1813 and 1823), processors 1811 and 1821, and memories 1812 and 1822.

The eNB and the UE may further input units and output units.

The communication units 1813 and 1823, the processors 1811 and 1821, the input units, the output units, and the memories 1812 and 1822 are operatively connected with each other in order to conduct the methods as proposed in the present disclosure.

The communication units (transmitting/receiving units or RF units, 1813 and 1823), when receiving information created from a PHY (Physical Layer) protocol, transfer the received information through RF (Radio-Frequency) spectrums and conduct filtering and amplification, then transmit it through antennas. Further, the communication units transfer RF (Radio Frequency) signals received through the antennas to bands available to be processed in the PHY protocol and perform filtering.

In addition, the communication units may also include the functions of switches to switch transmitting and receiving functions.

The processors 1811 and 1821 implement functions, procedures, and/or methods as proposed in the present disclosure. The layers of radio interface protocols may be implemented by the processors.

The processors may be represented as control parts, controllers, control units, or computers.

The memories 1812 and 1822 are connected with the processors and store protocols or parameters for performing the method proposed in the present disclosure.

The processors 1811 and 1821 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other storage devices. The communication unit may include a base-band circuit for processing a radio signal. When the embodiment is implemented in software, the aforementioned methods may be implemented with a module (process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present invention.

The method for direction-based searching a device proposed in the present disclosure, rather than limited to the configurations and methods according to the above-described embodiments, may be configured so that all or some of the embodiments may be selectively combined with each other to allow for various variations or modifications.

Meanwhile, the method for direction-based searching a device of the present disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments have been depicted and described so far, but the present disclosure is not limited to the specific embodiment described above. It is understood that various modifications are available by those skilled in the dart without departing from the technical feature of the present invention claimed in claims, and such modifications should not be individually understood from the technical spirit and prospect of the present invention.

Further, both of the method invention and the device invention are described in the present disclosure, and both of the invention may be applied complementarily with each other as occasion demands.

INDUSTRIAL APPLICABILITY

The present invention is applied to a 3GPP LTE/LTE-A system is primarily described, but can be applied to various wireless communication systems in addition to the 3GPP LTE/LTE-A system.

The invention claimed is:

1. A method for performing a mobility management entity (MME) change by a first mobility management entity (MME) in a wireless communication system, the method comprising:
receiving a tracking area update (TAU) request message from a user equipment (UE) via a base station, wherein the TAU request message includes MME information about a second MME to be changed;
transmitting a context request message to the second MME to request context information of the user equipment;
receiving a context response message including the context information from the second MME, wherein the context information includes user equipment information related to one or more user equipments linked to the user equipments, and MME information related to at least one MME managing the one or more user equipments; and
transmitting a message to the at least one MME to inform that a MME managing a mobility of the user equipment (UE) has been changed from the second MME to the first MME.

2. The method of claim 1, wherein the one or more user equipments linked to the user equipment are assigned same Internet protocol (IP) address as the user equipment.

3. The method of claim 1, wherein the method further comprises:
transmitting to a gateway a session creation request message requesting creation of a session; and
receiving a session creation response message in response to the session creation request message,
wherein the message is transmitted after the session creation response message has been received.

4. The method of claim 1, wherein the method further comprises:
transmitting to a gateway a session change request message requesting a change of a session; and
receiving a session change response message in response to the session change request message,
wherein the message is transmitted after the session change response message has been received.

5. The method of claim 1, wherein the method further comprises:

transmitting to a home subscriber sever (HSS) a location updating request message requesting updating of a location of the user equipment; and
in response to the location updating request message, receiving a location updating acknowledge message from the HHS,
wherein the message is transmitted after the location updating acknowledge message has been received.

6. The method of claim 1, wherein the user equipment information includes identification information to identify the one or more user equipments,
wherein the MME information includes identification information to identify the at least one MME managing a mobility of the one or more user equipment.

7. The method of claim 1, wherein the context information further includes a gateway identifier assigned to the user equipment, and a session identifier indicating a session established between the user equipment and the gateway.

8. A method for performing, by a home subscriber sever (HSS), a tracking area update (TAU) procedure with a mobility management entity (MME) change in a wireless communication system, the method comprising:
receiving from a first MME a location updating request message requesting updating of a location of a user equipment;
transmitting a location registration cancel message to a second MME to request cancellation of a location registration of the user equipment;
receiving a location registration cancel acknowledge message from the second MME in response to the location registration cancel message;
transmitting a location updating acknowledge message to the first MME in response to the location updating message; and
transmitting a message to at least one MME managing a mobility of one or more user equipments linked to the user equipment in order to inform that a MME for the user equipment has been changed from the second MME to the first MME,
wherein the HSS stores context information about each of the user equipment and the one or more user equipments.

9. The method of claim 8, wherein the one or more user equipments linked to the user equipment are assigned same Internet protocol (IP) address as the user equipment.

10. The method of claim 8, wherein the context information includes at least one of:
a first user equipment identifier for identifying each of the user equipment and the one or more user equipments;
a second user equipment identifier for identifying an user equipment linked to each of the user equipment and the one or more user equipments;
a gateway identifier for identifying an allocated gateway; or
a session identifier for identifying a session established between the gateway and the user equipment and the one or more user equipments.

11. A first mobility management entity (MME) for performing a MME change in a wireless communication system, the first MME comprising:
a communication unit configured to transmit and receive a radio signal with an external; and
a processor functionally coupled to the communication unit, wherein the processor is configured for:
receiving a tracking area update (TAU) request message from a user equipment (UE) via a base station, wherein the TAU request message includes MME information about a second MME to be changed;

transmitting a context request message to the second MME to request context information of the user equipment;

receiving a context response message including the context information from the second MME, wherein the context information includes user equipment information related to one or more user equipments linked to the user equipments, and MME information related to at least one MME managing the one or more user equipments; and transmitting a message to the at least one MME to inform that a MME managing a mobility of the user equipment (UE) has been changed from the second MME to the first MME.

* * * * *